(12) United States Patent
Little et al.

(10) Patent No.: US 8,591,747 B2
(45) Date of Patent: *Nov. 26, 2013

(54) DEVICES AND METHODS FOR CONTROLLED RELEASE OF ADDITIVE COMPOSITIONS

(75) Inventors: David Alan Little, Newtown, PA (US); Magesh Sundaram, Chicago, IL (US)

(73) Assignee: Dober Chemical Corp., Woodridge, IL (US)

( * ) Notice: Subject to any disclaimer, the term of this patent is extended or adjusted under 35 U.S.C. 154(b) by 431 days.

This patent is subject to a terminal disclaimer.

(21) Appl. No.: 12/455,040

(22) Filed: May 26, 2009

(65) Prior Publication Data

US 2009/0301968 A1 Dec. 10, 2009

Related U.S. Application Data

(63) Continuation-in-part of application No. 12/154,898, filed on May 27, 2008.

(60) Provisional application No. 61/163,796, filed on Mar. 26, 2009, provisional application No. 61/130,072, filed on May 27, 2008.

(51) Int. Cl.
*C02F 1/68* (2006.01)

(52) U.S. Cl.
USPC ...... 210/749; 210/764; 210/206; 210/321.84; 422/261; 137/268

(58) Field of Classification Search
USPC ............. 210/749, 120, 167.3, 205, 206, 209, 210/764, 321.84; 422/261, 263, 274, 275, 422/276, 278; 137/268

See application file for complete search history.

(56) References Cited

U.S. PATENT DOCUMENTS

| | | | |
|---|---|---|---|
| 2,280,792 | A | 4/1942 | Bruson |
| 2,754,330 | A | 2/1957 | Schreyer |
| 2,782,240 | A | 2/1957 | Hefner et al. |
| 2,841,479 | A | 7/1958 | Hefner et al. |
| 2,928,877 | A | 3/1960 | Jaul et al. |
| 2,955,028 | A | 10/1960 | Bevans |
| 3,087,436 | A | 4/1963 | Dettlof et al. |
| 3,172,892 | A | 3/1965 | Le Suer et al. |
| 3,215,707 | A | 11/1965 | Rense |
| 3,231,587 | A | 1/1966 | Rense |
| 3,272,746 | A | 9/1966 | Le Suer et al. |

(Continued)

FOREIGN PATENT DOCUMENTS

| | | |
|---|---|---|
| EP | 0279863 | 8/1988 |
| EP | 0448365 | 9/1991 |

(Continued)

OTHER PUBLICATIONS

Text file of US 4,702,270 King, Sr. (1987).*

(Continued)

*Primary Examiner* — Lucas Stelling
(74) *Attorney, Agent, or Firm* — Stout, Uxa, Buyan & Mullins; Frank J. Uxa

(57) ABSTRACT

Containers for controlled release of an additive composition into a liquid composition include a liquid impermeable casing having a hollow interior, at least one opening and a membrane component secured to the casing. Methods of releasing additive compositions into liquid compositions are also provided.

10 Claims, 9 Drawing Sheets

(56) References Cited

U.S. PATENT DOCUMENTS

| | | |
|---|---|---|
| 3,275,554 A | 9/1966 | Wagenaar |
| 3,336,223 A | 8/1967 | Kneeland |
| 3,361,673 A | 1/1968 | Stuart et al. |
| 3,368,972 A | 2/1968 | Otto |
| 3,413,347 A | 11/1968 | Worrel |
| 3,422,157 A | 1/1969 | Kaufman et al. |
| 3,438,757 A | 4/1969 | Honnen et al. |
| 3,440,029 A | 4/1969 | Little et al. |
| 3,454,555 A | 7/1969 | van der Voort et al. |
| 3,454,607 A | 7/1969 | Le Suer et al. |
| 3,565,804 A | 2/1971 | Honnen et al. |
| 3,574,576 A | 4/1971 | Honnen et al. |
| 3,598,738 A | 8/1971 | Biswell et al. |
| 3,649,229 A | 3/1972 | Otto |
| 3,671,511 A | 6/1972 | Honnen et al. |
| 3,697,574 A | 10/1972 | Piasek et al. |
| 3,710,942 A * | 1/1973 | Rosenberg .................... 210/136 |
| 3,715,037 A | 2/1973 | Hu |
| 3,725,277 A | 4/1973 | Worrel |
| 3,726,882 A | 4/1973 | Traise et al. |
| 3,749,247 A | 7/1973 | Rohde |
| 3,755,433 A | 8/1973 | Miller et al. |
| 3,756,793 A | 9/1973 | Robinson |
| 3,790,359 A | 2/1974 | Feldman |
| 3,822,289 A | 7/1974 | Clark et al. |
| 3,849,085 A | 11/1974 | Kreuz et al. |
| 3,877,899 A | 4/1975 | Bundy et al. |
| 3,880,569 A | 4/1975 | Bannister et al. |
| 3,912,764 A | 10/1975 | Palmer, Jr. |
| 3,932,537 A | 1/1976 | Wetzel et al. |
| 3,954,808 A | 5/1976 | Elliott et al. |
| 3,977,992 A | 8/1976 | Hofacker |
| 3,980,569 A | 9/1976 | Pindar et al. |
| 3,999,960 A | 12/1976 | Langer, Jr. et al. |
| 4,026,809 A | 5/1977 | Lachowicz et al. |
| 4,032,700 A | 6/1977 | Song et al. |
| 4,034,756 A | 7/1977 | Higuchi et al. |
| 4,066,559 A | 1/1978 | Rohde |
| 4,075,097 A | 2/1978 | Paul |
| 4,075,098 A | 2/1978 | Paul et al. |
| 4,110,349 A | 8/1978 | Cohen |
| 4,125,382 A | 11/1978 | O'Brien et al. |
| 4,129,421 A | 12/1978 | Webb |
| 4,137,185 A | 1/1979 | Gardiner et al. |
| 4,156,061 A | 5/1979 | Pappas et al. |
| 4,214,994 A | 7/1980 | Kitano et al. |
| 4,222,746 A | 9/1980 | Sweeney et al. |
| 4,231,759 A | 11/1980 | Udelhofen et al. |
| 4,234,435 A | 11/1980 | Meinhardt et al. |
| 4,238,628 A | 12/1980 | Cahill et al. |
| 4,247,301 A | 1/1981 | Honnen |
| 4,261,704 A | 4/1981 | Langdon |
| 4,265,748 A | 5/1981 | Villani et al. |
| 4,294,586 A | 10/1981 | Cox, Jr. |
| 4,320,019 A | 3/1982 | Hayashi |
| 4,323,714 A | 4/1982 | Malloy et al. |
| 4,326,972 A | 4/1982 | Chamberlin, III |
| 4,357,236 A | 11/1982 | Krueger |
| 4,357,250 A | 11/1982 | Hayashi |
| 4,365,973 A | 12/1982 | Irish |
| 4,369,112 A | 1/1983 | Vincent et al. |
| 4,370,305 A | 1/1983 | Affonso |
| 4,379,065 A | 4/1983 | Lange |
| 4,444,730 A | 4/1984 | Renders et al. |
| 4,460,379 A | 7/1984 | Sweeney et al. |
| 4,469,908 A | 9/1984 | Burress |
| 4,489,857 A * | 12/1984 | Batlas ........................... 222/179 |
| 4,515,740 A | 5/1985 | Schuettenberg et al. |
| 4,561,981 A | 12/1985 | Characklis |
| 4,639,255 A | 1/1987 | Schuettenberg et al. |
| 4,658,078 A | 4/1987 | Slaugh et al. |
| 4,662,387 A | 5/1987 | King, Sr. |
| 4,663,063 A | 5/1987 | Davis |
| 4,668,834 A | 5/1987 | Rim et al. |
| 4,673,527 A | 6/1987 | Goudy, Jr. et al. |
| 4,702,270 A | 10/1987 | King, Sr. |
| 4,708,809 A | 11/1987 | Davis |
| 4,717,495 A | 1/1988 | Hercamp et al. |
| 4,728,452 A | 3/1988 | Hansen |
| 4,740,321 A | 4/1988 | Davis et al. |
| 4,755,189 A | 7/1988 | Feldman |
| 4,756,844 A | 7/1988 | Walles et al. |
| 4,782,891 A | 11/1988 | Cheadle et al. |
| 4,849,569 A | 7/1989 | Smith, Jr. |
| 4,857,073 A | 8/1989 | Vataru et al. |
| 4,862,908 A | 9/1989 | Payer |
| 4,892,562 A | 1/1990 | Bowers et al. |
| 4,900,441 A | 2/1990 | Graus et al. |
| 4,904,401 A | 2/1990 | Ripple et al. |
| 4,937,299 A | 6/1990 | Ewen et al. |
| 4,980,075 A | 12/1990 | Dobrez et al. |
| 4,981,602 A | 1/1991 | Ripple et al. |
| 5,019,669 A | 5/1991 | Adams et al. |
| 5,032,259 A | 7/1991 | He et al. |
| 5,050,549 A | 9/1991 | Sturmon |
| 5,053,152 A | 10/1991 | Steckel |
| 5,059,217 A | 10/1991 | Arroyo et al. |
| 5,071,919 A | 12/1991 | DeGonia et al. |
| 5,089,041 A | 2/1992 | Thompson et al. |
| 5,094,666 A | 3/1992 | Feldman et al. |
| 5,120,349 A | 6/1992 | Stewart et al. |
| 5,137,978 A | 8/1992 | Degonia et al. |
| 5,137,988 A | 8/1992 | Matzner et al. |
| 5,160,648 A | 11/1992 | Steckel |
| 5,186,732 A | 2/1993 | Thompson et al. |
| 5,192,335 A | 3/1993 | Cherpeck |
| 5,230,714 A | 7/1993 | Steckel |
| 5,235,936 A | 8/1993 | Kracklauer |
| 5,249,552 A | 10/1993 | Brooks |
| 5,286,823 A | 2/1994 | Rath |
| 5,296,154 A | 3/1994 | Steckel |
| 5,300,701 A | 4/1994 | Cherpeck |
| 5,324,800 A | 6/1994 | Welborn, Jr. et al. |
| 5,332,407 A | 7/1994 | Herbstman |
| 5,336,278 A | 8/1994 | Adams et al. |
| 5,337,705 A | 8/1994 | Lane |
| 5,346,965 A | 9/1994 | Dever et al. |
| 5,368,615 A | 11/1994 | Steckel |
| 5,372,942 A | 12/1994 | McGarrity et al. |
| 5,407,594 A | 4/1995 | Fry et al. |
| 5,408,018 A | 4/1995 | Rath |
| 5,435,346 A | 7/1995 | Tregidgo et al. |
| 5,456,217 A | 10/1995 | Thunker et al. |
| 5,458,793 A | 10/1995 | Adams et al. |
| 5,483,327 A | 1/1996 | Taya et al. |
| 5,496,383 A | 3/1996 | Franz et al. |
| 5,507,942 A | 4/1996 | Davis |
| 5,508,356 A | 4/1996 | Dever et al. |
| 5,527,452 A | 6/1996 | Grigoriev et al. |
| 5,565,106 A | 10/1996 | Sherbondy et al. |
| 5,567,845 A | 10/1996 | Franz et al. |
| 5,573,557 A | 11/1996 | Thünker et al. |
| 5,580,359 A | 12/1996 | Wright |
| 5,591,330 A | 1/1997 | Lefebvre |
| 5,620,949 A | 4/1997 | Baker et al. |
| 5,643,351 A | 7/1997 | Lew et al. |
| 5,662,795 A * | 9/1997 | Pickens et al. ................. 137/268 |
| 5,662,799 A | 9/1997 | Hudgens et al. |
| 5,662,803 A | 9/1997 | Young |
| 5,662,808 A | 9/1997 | Blaney et al. |
| 5,663,457 A | 9/1997 | Kolp |
| 5,674,950 A | 10/1997 | Thaler |
| 5,691,422 A | 11/1997 | Emert et al. |
| 5,695,531 A | 12/1997 | Makino et al. |
| 5,695,545 A | 12/1997 | Cho et al. |
| 5,696,060 A | 12/1997 | Baker et al. |
| 5,696,067 A | 12/1997 | Adams et al. |
| 5,711,894 A | 1/1998 | Miyake et al. |
| 5,713,384 A | 2/1998 | Roach et al. |
| 5,718,836 A | 2/1998 | Nakatani et al. |
| 5,739,356 A | 4/1998 | Dietz et al. |
| 5,741,433 A | 4/1998 | Mitchell et al. |
| 5,752,989 A | 5/1998 | Henly et al. |
| 5,752,991 A | 5/1998 | Plavac |

(56) References Cited

U.S. PATENT DOCUMENTS

| | | |
|---|---|---|
| 5,756,435 A | 5/1998 | Carey et al. |
| 5,772,873 A | 6/1998 | Hudgens et al. |
| 5,777,041 A | 7/1998 | Emert et al. |
| 5,777,142 A | 7/1998 | Adams et al. |
| 5,780,554 A | 7/1998 | Emert et al. |
| 5,786,490 A | 7/1998 | Dietz et al. |
| 5,803,024 A | 9/1998 | Brown |
| 5,808,643 A | 9/1998 | Tracy et al. |
| 5,810,999 A | 9/1998 | Bachand et al. |
| 5,829,976 A | 9/1998 | Brown |
| 5,833,722 A | 11/1998 | Davies et al. |
| 5,840,920 A | 11/1998 | Baker |
| 5,856,524 A | 1/1999 | Dietz et al. |
| 5,880,219 A | 3/1999 | Thaler et al. |
| 5,897,770 A | 4/1999 | Hatch et al. |
| 5,919,869 A | 7/1999 | Thaler et al. |
| 5,948,248 A | 9/1999 | Brown |
| 6,004,582 A | 12/1999 | Faour et al. |
| 6,010,639 A | 1/2000 | Mitchell et al. |
| 6,017,369 A | 1/2000 | Ahmed |
| 6,020,500 A | 2/2000 | Baker et al. |
| 6,074,445 A | 6/2000 | Ahmed |
| 6,114,547 A | 9/2000 | Baker et al. |
| 6,138,703 A | 10/2000 | Ferguson et al. |
| 6,140,541 A | 10/2000 | Melder et al. |
| 6,183,524 B1 | 2/2001 | Ahmed |
| 6,238,554 B1 | 5/2001 | Martin, Jr. |
| 6,267,886 B1 * | 7/2001 | Brandreth, III ............... 137/268 |
| RE37,369 E | 9/2001 | Hudgens et al. |
| 6,298,871 B1 * | 10/2001 | Pickens et al. ............... 137/268 |
| 6,322,694 B1 | 11/2001 | Iliadis et al. |
| 6,565,743 B1 | 5/2003 | Poirier et al. |
| 6,827,750 B2 | 12/2004 | Drozd et al. |
| 6,835,218 B1 | 12/2004 | Drozd et al. |
| 6,860,241 B2 | 3/2005 | Martin et al. |
| 6,878,309 B2 | 4/2005 | Blakemore et al. |
| 6,919,023 B2 | 7/2005 | Merritt et al. |
| 7,001,531 B2 | 2/2006 | Chen et al. |
| 7,581,558 B2 * | 9/2009 | Martin et al. ............... 210/206 |
| 7,938,277 B2 * | 5/2011 | Kelly et al. ............... 210/206 |
| 2003/0053927 A1 | 3/2003 | Drozd et al. |
| 2007/0000831 A1 * | 1/2007 | Kelly et al. ............... 210/749 |
| 2007/0102332 A1 * | 5/2007 | Bommi et al. ............... 210/435 |
| 2007/0158292 A1 | 7/2007 | Clark et al. |
| 2007/0163968 A1 | 7/2007 | Steimel et al. |
| 2007/0241042 A1 | 10/2007 | Martin et al. |
| 2007/0280981 A1 | 12/2007 | Birthisel |

FOREIGN PATENT DOCUMENTS

| | | |
|---|---|---|
| EP | 0476485 | 3/1992 |
| EP | 0516838 | 12/1992 |
| EP | 0573578 | 12/1993 |
| GB | 2391186 A | 4/2004 |
| WO | WO9837959 A2 | 9/1998 |

OTHER PUBLICATIONS

USPTO Office Action dated Jul. 26, 2010 in U.S. Appl. No. 12/154,899, filed May 27, 2008.
USPTO Office Action dated Dec. 16, 2010 in U.S. Appl. No. 12/154,899, filed May 27, 2008.
USPTO Office Action dated Oct. 13, 2010 in U.S. Appl. No. 12/154,898, filed May 27, 2008.
USPTO Office Action dated Feb. 16, 2010 in U.S. Appl. No. 12/154,898, filed May 27, 2008.
English language abstract of European Patent 0476485 obtained from esp@cenet website—espacenet.com, 1992.
Kelly et al., U.S. Appl. No. 12/154,955, filed May 27, 2008.
Sundaram et al., U.S. Appl. No. 12/154,900, filed May 27, 2008.
Kelly et al., U.S. Appl. No. 12/154,899, filed May 27, 2008.
Sundaram et al., U.S. Appl. No. 61/130,072, filed May 27, 2008.
Kelly et al., U.S. Appl. No. 10/701,133, filed Nov. 3, 2003.
Kelly et al., U.S. Appl. No. 11/516,150, filed Sep. 5, 2006.
USPTO Office Action dated Dec. 19, 2002 in U.S. Appl. No. 09/939,214, filed Aug. 24, 2001.
USPTO Office Action dated Jul. 1, 2003 in U.S. Appl. No. 09/939,214, filed Aug. 24, 2001.
USPTO Office Action dated Sep. 25, 2003 in U.S. Appl. No. 09/939,214, filed Aug. 24, 2001.
USPTO Office Action dated Jan. 25, 2006 in U.S. Appl. No. 10/701,133, filed Nov. 3, 2003.
USPTO Office Action dated May 3, 2006 in U.S. Appl No. 10/701,133, filed Nov. 3, 2003.
USPTO Office Action dated Dec. 16, 2008 in U.S. Appl. No. 11/516,150, filed Sep. 5, 2006.
PCT International Search Report and Written Opinion mailed Aug. 27, 2009 in PCT Application No. PCT/US09/03227.
PCT International Search Report and Written Opinion mailed Aug. 27, 2009 in PCT Application No. PCT/US09/03236.
PCT International Search Report and Written Opinion mailed Aug. 19, 2009 in PCT Application No. PCT/US09/03228.
U.S. Patent Office Action dated Nov. 29, 2011 in U.S. Appl. No. 12/455,041, filed May 26, 2009.
U.S. Patent Office Action dated Aug. 2, 2012 in U.S. Appl. No. 12/154,898, filed May 27, 2008.

* cited by examiner

DEVICES AND METHODS FOR CONTROLLED RELEASE OF ADDITIVE COMPOSITIONS

CROSS-REFERENCE TO RELATED APPLICATIONS

The present application is a continuation-in-part of application Ser. No. 12/154,898, filed May 27, 2008 and the present application claims the benefit of U.S. Provisional Application Ser. Nos. 61/163,796 filed Mar. 26, 2009 and 61/130,072, filed May 27, 2008, the disclosures of each of these applications being incorporated in their entirety herein by reference.

FIELD OF THE INVENTION

The present invention relates to devices and methods for providing additive compositions comprising a chemical additive component to liquid compositions, such as industrial liquid compositions in cooling systems, for example, but not limited to, open circulating cooling or coolant systems, such as cooling towers and the like, humidification systems, recirculated spray water systems, fire quench tanks, fuel storage tanks, and the like.

BACKGROUND OF THE INVENTION

Liquids in various systems are plagued by the buildup of scale and/or corrosion and/or one or more other contaminant materials often due to thermal and/or otherwise caused breakdown of dissolved components and assault of dissolved electrolytes on surfaces, for example, metal surfaces, of the system and/or one or more other environmental conditions. In an effort to mitigate this buildup/contamination, various chemical additives typically are added periodically to the such systems, e.g., whenever liquid is added to the system. The chemical additives include, but are not limited to, anti-foulants, anti-scaling agents, corrosion inhibitors, pH buffering agents, microbiocides, and the like. Usually, the concentration of a particular agent in the system, for example, a cooling system, which can vary due to evaporation, chemical neutralization, and degradation, etc., is not known at any given time. Instead, a predefined amount of additives in a predetermined ratio is added to the system at regular maintenance intervals or whenever liquid levels drop to a level requiring additional liquid.

Various methods of introducing additives to fluid or liquid systems, generally, have been proposed. Rohde U.S. Pat. No. 3,749,247 describes a container for releasing an oxidation inhibitor into hydrocarbon-based lubricating oil in a working engine. The oxidation inhibitor is held in a polyolefin container that permits the additive to permeate through the container wall into the oil. A further approach is described by Lefebvre U.S. Pat. No. 5,591,330, which discloses a hydrocarbon oil filter wherein oxidation additives in a thermoplastic material are mounted in a casing between a particle filtering material and a felt pad. Reportedly, the thermoplastic material dissolves in the presence of high temperature oil thereby releasing the additives. Additionally, an additive release device for use in an engine hydrocarbon fuel line is proposed by Thunker et al U.S. Pat. No. 5,456,217. The latter device comprises a partially permeable cartridge positioned in the filling neck of the fuel tank so that whenever fuel is added a portion of the additive contents of the cartridge is released into the tank.

Aqueous-based liquids present an environment distinct from those of hydrocarbon fluids. For instance, most thermoplastics do not dissolve in aqueous solutions. Moreover, relatively large quantities of additives need to be provided in a typical industrial liquid, e.g., aqueous liquid, such as an industrial liquid used outside an engine or engine cooling system. Sudden provision of such large amounts of additives can cause a "slug" of material to precipitate and circulate in the system, which can result in damage and failure of pump seals. It would be advantageous to provide relatively low cost, quickly installed apparatus and methods that release additive compositions comprising chemical additives into liquid compositions, such as industrial liquid compositions at sustained rates to allow such compositions to function effectively without becoming unduly contaminated or otherwise being detrimentally affected by the additive compositions.

SUMMARY OF THE INVENTION

New apparatus and methods for providing release, preferably sustained release, of additive compositions comprising a chemical additive component into a liquid composition have been discovered. The present apparatus and methods effectively provide for gradual, preferably sustained, and more preferably substantially controlled, release of additive compositions from the apparatus into liquid compositions, for example, aqueous liquid compositions; a liquid comprising water and at least one freezing point depressant, such as at least one glycol; substantially non-aqueous liquids; and the like. Advantageously, the additive composition is released only through a limited portion of the apparatus, for example, over a relatively prolonged period of time. The present apparatus and methods have been found to be highly effective and convenient in controlling the release of additive compositions into liquid compositions.

Many components of the apparatus of the invention, for example, other than the additive composition, are substantially insoluble in the liquid composition so that these components remain intact and do not dissolve into and/or otherwise detrimentally affect the liquid composition or the system in which the liquid composition is located or employed. In addition, the insoluble components of the present apparatus may or may not be reused after release of the additive composition contained therein. The present apparatus are easy and straightforward to manufacture cost effectively and can easily and effectively be used in a relatively wide variety of systems/applications with little or no modification to effectively control the release of the additive composition into the liquid composition and/or the quality of the liquid composition.

In one broad aspect, the present invention is directed to additive composition containers for releasing additive compositions into compositions, for example, liquid compositions. The containers are often designed to provide gradual, preferably sustained, and more preferably substantially controlled, release of additive compositions into liquid compositions, for example, industrial liquid compositions.

In one embodiment, the present containers comprise a casing, for example, separate and apart from an engine, such as an internal combustion engine, filter housing, which is impermeable to a liquid composition, that is to be treated using the container. The casing defines a substantially hollow interior and at least one opening, for example, located in an outermost wall of the casing. In one embodiment, the casing includes only one opening.

An additive composition comprising a chemical additive component is provided or located in the interior of the casing.

In one embodiment, the additive composition is substantially the only active composition, for example, substantially the only composition effective to have a significant effect or benefit on the liquid composition in contact with the casing, in the hollow interior of the casing. The additive composition may be provided in the form of a liquid, gel, paste, or in solid form. In one particularly useful embodiment of the invention, the additive composition is provided as a plurality of particles, or in particulate form, for example, in the form of beads, tablets, pellets, grains, other particulate forms and mixtures thereof.

The containers of the present invention also include at least one liquid-permeable element or component which is provided at or near the at least one opening of the casing. This liquid-permeable element, for example and without limitation, comprising a membrane or membrane component, for example, a control membrane or control membrane component, is effective to provide for release, for example, controlled release, of substantially all or a portion of the additive composition in the casing into a liquid composition, for example, a liquid composition in contact with the casing. Such release occurs over a period of time so that a portion of the additive composition is retained within the casing. The release may occur at a sustained rate or even a substantially constant rate, for example, at least after the initial release of additive composition occurs. The additive composition release obtained in accordance with the present invention may involve diffusion of the additive composition into the liquid composition, and preferably is sustained additive composition release.

In a very useful embodiment, the casing is structured to be not reuseable, e.g., to be discarded or disposed of after a single use. For example, the casing advantageously is structured so as not to be refillable with additive composition. Providing a "single use" container, that is a container having a non-reuseable casing, avoids direct human contact with additive compositions or additive components which can be toxic to humans or otherwise dangerous to handle by humans. During initial mass production manufacture of the present containers, safeguards are provided to avoid substantial direct human contact with the additive compositions used to fill the casings. Such safeguards are often not available when refilling a single casing or a small number of casings with additive composition. Therefore, for example, in order to promote user safety and/or to provide containers of high and consistent quality, the present containers are structured for one-time use, for example, so that they cannot be refilled with additive composition and/or otherwise reused.

In one embodiment, the casing includes a further opening or at least one further opening, into the hollow interior, for example, spaced apart from the at least one opening of the casing. The further opening or openings may be positioned to allow air to pass out of the hollow interior through the further opening or openings.

A structure is or may be provided which is operatively coupled to the further opening and operable to allow air to pass out of the hollow interior through the further opening or openings. The structure may also be operable to substantially prevent a liquid composition from passing out of the hollow interior through the further opening or openings. Such structure, for example and without limitation, selected from including an element, a membrane member, for example, an air permeable membrane member, a valve and the like, facilitates effective contact between the additive composition in the casing and the liquid composition being treated. In one embodiment, the structure is advantageously effective to allow the liquid composition and additive composition to exit the hollow interior of the casing through the at least one opening, while substantially preventing such release through the further opening or openings.

In a useful embodiment, the structure is effective to substantially prevent liquid composition in contact with the casing from entering the hollow interior through the further opening or openings. The structure may include a removable plug which is removably fitted into the further opening or openings. With the plug removed, liquid composition may be added to the hollow interior of the casing, for example, through the further opening or openings, to pre-condition, e.g., pre-wet, the additive composition in the hollow interior prior to use of the container. Such pre-conditioning may facilitate the timely initial release of one or more additive components in the additive composition which are difficult to wet and, therefore, without such pre-conditioning, e.g., pre-wetting, are released into the liquid composition only after an unacceptably long period of time after the container is placed in use. During use of the container in treating a liquid composition, the plug may be reinserted into the further opening or openings, for example, to substantially prevent the liquid composition and additive composition from leaving the hollow interior of the casing through the further opening or openings.

The casing and other liquid-impermeable components, for example, components which are insoluble in the liquid composition at conditions of use of such components, of the apparatus of the present invention are preferably composed of materials selected from suitable metals, liquid-insoluble polymeric materials, combinations thereof and mixtures thereof. Useful casings can be made of materials selected from metals, such as steel, aluminum, metal alloys and the like; polymeric materials such as polyvinyl chloride, polyethylene, polypropylene, other polyolefins, nylon, polyethylene vinyl acetate (EVA), polypropylene vinyl acetate (PVA), combinations thereof and mixtures thereof, and the like.

The liquid-permeable element(s) or component(s) may comprise any suitable liquid-permeable structure, and all such structures are included within the scope of the present invention. In one particularly useful embodiment, the liquid-permeable element or component comprises a membrane or membrane component, such as, without limitation, filter members or filter media, for example, porous or semi-permeable membrane members or components.

The membrane component, for example, porous or semi-permeable membrane, of the apparatus of the invention may be made of any suitable material that permits the desired, preferably sustained, release of the additive composition into the liquid composition, particularly when the casing is in contact with the liquid composition. The membrane can be made of a liquid-insoluble material, for instance, having irregularly-sized channels or discrete-sized pores therein. As used herein, a "porous" membrane refers generally to membranes having pores in a substantially discrete size range, such as a wire screen or filter media, for example, filter paper and the like. As used herein, a "semi permeable" membrane refers to a continuous medium, which does not have pores in a discrete size range, but instead preferably permits diffusion of molecules through narrow channels, the size of which can be difficult to measure.

In one embodiment, the membrane component, for example, the porous or semi-permeable membrane, comprises one or more metals and/or glasses and/or one or more polymeric materials and/or one or more papers and/or the like, combinations thereof and mixtures thereof. Very useful membranes can be made of materials selected from polyamides, for example nylons and the like, cellulosic components, for example, cellulose acetate and other cellulosic polymers, glasses, fiber glasses, polyesters, polyurethanes, polyvinyl chloride, polyethylene vinyl acetate, polypropylene vinyl acetate, natural and synthetic rubbers, and the like, combinations thereof and mixtures thereof.

The membrane component or member may be secured to the casing in any suitable manner. For example, the membrane may be adhered to the casing using an adhesive or glue; may be secured to the casing by press fitting or interference fitting the membrane to the casing; may be secured to the casing by co-molding the membrane with the casing, or at least a portion of the casing; and/or may be otherwise secured or fixedly secured to the casing.

In one very useful embodiment, the membrane is co-molded with at least a portion of the casing. Such co-molding provides a strong and fixed securement of the membrane to the casing, and avoids the use of adhesives or glues which may have an adverse impact on the liquid composition being treated using the present apparatus.

In an additional embodiment, the casing includes a casing body and an end portion structured to be coupled to the casing body. The end portion may be removable from the casing body without destroying one or both of the end portion and the casing body. In one embodiment, the membrane component is secured to, for example, co-molded with, the end portion. The end portion may be structured to be removable from the casing body to refill the casing with additive composition. The end portion, or a different end portion, for example, with a different, for example, unused membrane component, can be attached to the casing body so that the apparatus is reusable.

The casing body and end portion may comprise the same or different materials of construction. At least one of the casing body and the end portion may comprise a polymeric material. For example, both the casing body and the end portion may comprise a polymeric material, for example, the same polymeric material or different polymeric materials.

In one useful embodiment, the end portion includes a support structure to support the membrane component.

At least one or both of the casing body and the end portion may be reusable. The casing body may be structured to be reused with a different end portion, for example, with the end portion originally included in the container being not reusable. The original end portion may be reusable with a different casing body.

The casing body may be structured to be refillable with additional additive composition, that is, an additive composition having the same chemical make-up or a different chemical make-up relative to the additive composition previously in the hollow interior of the casing.

In one embodiment, the container is structured to be not refillable with additional additive composition. For example, this casing may be structured so that it can not be opened, for example, for refilling, without-destroying the casing, or at least the usefulness of the casing.

The at least one further opening may be located in the body portion of the casing.

The end portion of the casing may be structured to be removable from the casing body, for example, by being rotated relative to the casing body.

The casing body may be structured to be coupled to any one of a plurality of end portions, for example, a plurality of different end portions.

In one embodiment, the hollow interior of the casing may have a volume in a range of about 1 ounce or less to about 100 ounces or more. The desired volume of the hollow interior is determined based upon the application in which the container is to be used. Thus, volumes well in excess of 100 ounces may be employed, for example, in applications where the volume of liquid composition to be treated is large and/or in applications in which a large amount of additive composition is to be provided to the liquid composition without the container being replaced.

In a further broad aspect of the invention, a container for releasing an additive composition into a liquid composition is provided. This container comprises a housing, an additive composition, and a membrane component, for example, as described elsewhere herein. In addition, the container of this aspect of the invention comprises an outer casing impermeable to a liquid composition, defining a substantially hollow interior space. The outer casing has an inlet into the interior space to allow a liquid composition to enter the interior space and an outlet to allow a liquid composition to pass out of the interior space. The casing, additive composition and membrane component are located in the interior space.

In one embodiment, a plurality of the casings, additive compositions and membrane components are located in the interior space of the outer casing. In this embodiment, at least two of the additive compositions may have the same chemical make-ups or different chemical make-ups.

In one useful embodiment, the outer casing includes two portions structured to be coupled to each other, uncoupled from each other and recoupled to each other.

In a further embodiment, the outer casing is structured to allow the casing or casings to be removed from the interior space and another casing or casings to be placed in the interior space without destroying the outer casing.

The outer casing may be configured to include the individual casings in a vertical array, for example, stacked one on top of another, in a horizontal array, for example, positioned in a side-by-side relation to each other, or in a array which is neither horizontal or vertical, for example, in a random array.

In another broad aspect, the invention is directed to methods for releasing an additive composition, preferably at a sustained, more preferably substantially controlled, rate into a liquid composition, for example, an industrial liquid composition. Optionally, the liquid composition can contain additives other than those being released by the apparatus of the present invention. The present methods comprise placing a container as set forth herein in contact with a liquid composition. When the container is exposed to a liquid composition, the liquid composition passes through, for example, diffuses through, and/or at least wets the liquid-permeable element or elements and contacts and/or comes in contact with a portion of the additive composition in the casing. Release, preferably sustained, substantially controlled release, of additive composition into the liquid composition is obtained, for example, by diffusion of the additive composition through the liquid-permeable element.

In one aspect of the invention, the liquid composition, after release of the additive composition into the liquid composition using containers of the present invention, is not potable.

In another aspect of the invention, the liquid composition, after release of the additive composition into the liquid composition, using one or more containers of the present invention, is potable.

The containers of the present invention may be used in any application in which it is beneficial, or otherwise useful, to release one or more additive components into a liquid composition. Such applications include, without limitation, cooling applications, such treating recirculating cooling water in industrial and commercial cooling systems; fungi and/or algae control applications; potable water system treating applications; reverse osmosis system treating applications;

swimming pools treating applications; spa and hot tub treating applications; down hole drilling treating applications; enhanced oil recovery treating applications; air washer, such as industrial air washer system treating application; aqueous and n on-aqueous metal working fluid treating applications; food processing applications, e.g. food, such as egg and/or other food stuffs, washing applications; pulp and paper mill treating applications; brewery pasteurizer water treating applications; industrial preservation applications; publicly owned water treatment applications; fracturing fluid heating applications; and the like.

The container or containers of the present invention may be employed by placing the container or containers in an appropriate position, for example, in or near the system to be treated, so that additive composition or additive compositions from the container or containers is or are released into the liquid composition in the system.

U.S. Pat. No. 7,001,531 is directed to somewhat related subject matter. The disclosure of this U.S. patent is incorporated in its entirety herein by reference.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

Additional aspects and advantages of the present invention are set forth in the following description and claims, particularly when considered in conjunction with the accompanying drawings in which like parts bear like reference numerals.

DETAILED DESCRIPTION OF THE INVENTION

Figure 1:
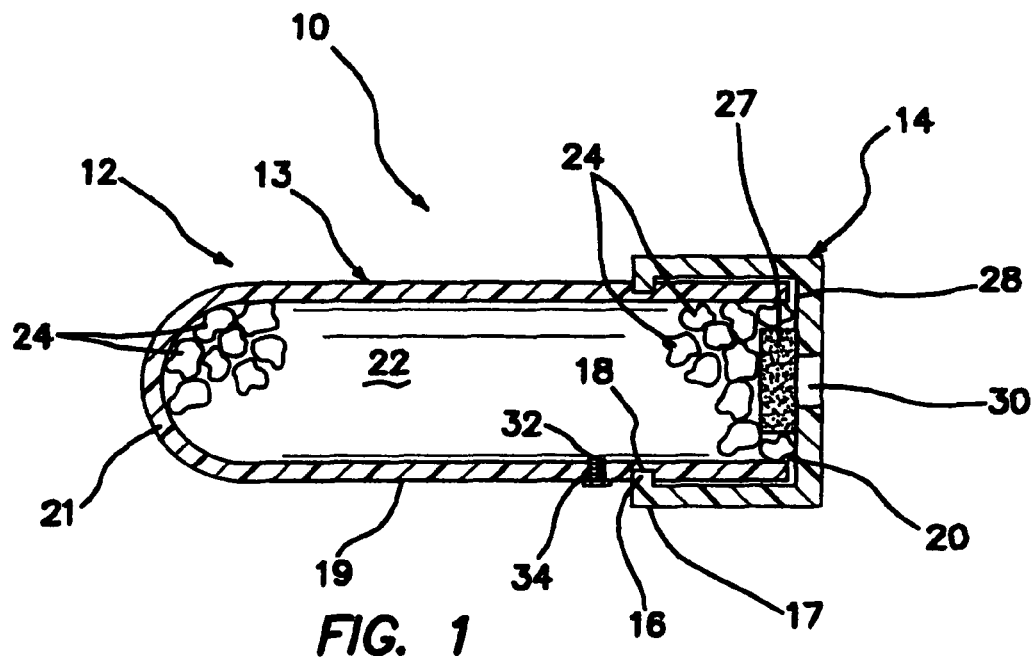
FIG. 1 is a cross-sectional view of a cylindrical shaped additive composition container of the present invention.

The present invention is directed to containers for use in liquid systems, including, but not limited to, industrial liquid compositions or systems in or associated with heavy equipment, including both stationary and mobile equipment, as well as open circulating coolant or cooling systems, such as cooling towers and the like; humidification systems; spray water systems; fire quench tanks; storage tanks, such as fuel storage tanks and other storage tanks; industrial recirculating closed cooling systems; process fluid systems, such as cutting and/or other machining oil systems, heating fluid systems, for example, thermal heating fluid systems, and the like; swimming pools; spas; and the like. Other applications for the containers of the present invention are disclosed elsewhere herein.

Such containers are effective in gradually, over a prolonged period of time, sustainably and/or otherwise controllably releasing, for example, under sustained and/or controlled conditions, additive compositions comprising one or more chemical additive components, for example and without limitation, corrosion inhibitors or corrosion control components, microbiocides, scale inhibitors or anti-scale components, dispersants, buffering agents, surfactants, anti-fouling agents and the like and mixtures thereof as described more fully elsewhere herein, into a liquid composition, for example, industrial liquid compositions, potable water, aqueous liquid compositions to be treated to be potable, other aqueous liquid compositions, non-aqueous liquid compositions and the like. As used herein, the term "industrial liquid composition" means a liquid composition, such as a non-aqueous liquid composition or non-potable aqueous liquid composition, useful for or in use in at least one industrial application. Industrial aqueous liquids often are not potable, that is, for example and without limitation, are not intended for and are not suitable for bathing or direct consumption by humans, or for use in irrigating fruits and vegetables, or processing foods, to be consumed by humans. In contrast, potable aqueous liquids, for example, potable water, are intended for and are suitable for bathing or direct consumption or contact by humans, or for use in irrigating fruits and vegetables or processing foods, to be consumed by humans.

Representative liquid compositions include, but are not limited to, liquids, such as substantially aqueous liquids with or without one or more additives effective to benefit the liquid compositions and/or the system in which the liquid composition is employed; substantially non-aqueous liquids; and the like.

The size and shape of the containers of the present invention are not of critical importance, provided that the size and shape of the particular container used in a particular application is sufficient or appropriate to allow the container to be effective to perform its function, that is to provide for the desired release of an additive composition into the liquid composition, in the particular application. For example, and without limitation, the containers may range in size and shape from, for example, a bowl-shaped or similarly shaped container, about 3 inches or less to about 5 inches or about 1 foot or more in depth and about 1 inch or less or about 3 inches to about 6 inches or more in diameter; and, for example, for a cylinder-shaped or similarly shaped container, from about 1 inch or less or about 6 inches or about 2 feet to about 4 feet or more in length and about 1 inch or less or 2 inches to about 6 inches or about 1 foot or more in diameter. The volume of the hollow interior of the casings of the containers of the present invention may be in a range of about 0.5 cubic inches or less or about 1 cubic inch or about 5 cubic inches or about 20 cubic inches to about 500 cubic inches or about 1000 cubic inches or about 1500 cubic inches or more.

In general, the containers may be placed so as to contact the liquid composition to be treated. For example, and without limitation, the container or containers may be placed in a conduit, or a sump or a pool or a skimmer, for example, of a swimming pool and the like in which a quantity or mass of liquid composition to be treated is located. The container or containers, for example, in cooling systems, may be placed in an open trough of flowing liquid composition. In other cases, one or more of the containers or casings may be placed in a larger outer casing, for example, cylinder or cylindrically shaped outer casing, through which the liquid composition is pumped, for example and without limitation, by a recirculation pump on a cooling tower. In still other cases, the containers may be placed in a sump or catch basin, for example, and without limitation, of a cooling tower or humidification system. The containers may be variously sized and shaped to facilitate placement in a system to allow for contact with the liquid composition to be treated and release of the additive composition into such liquid composition.

The liquid compositions often initially (that is prior to treatment in accordance with the present invention) include one or more additives that provide one or more benefits to the liquid composition and/or the system in which the liquid composition is employed. The liquid compositions which may be treated in accordance with the present invention include both aqueous compositions, that is compositions which include a major amount, such as at least about 50% or about 70% or about 80% by weight of water; and non-aqueous compositions, that is compositions which include less than about 50% or about 30% or about 10% by weight of water. The liquid composition may be substantially anhydrous, or anhydrous, for example, containing about 5% by weight or less of water. Optionally, the liquid compositions can contain one or more additives other than those being released by the apparatus of the present invention. These additives include, but are not limited to, such additive or additives which is (are) conventionally used in the type of liquid composition in question.

In one broad aspect, the present invention is directed to additive composition containers for use in cooling or coolant systems, for example, cooling or cooling systems not associated with engines, such as internal combustion engineers, other industrial systems or applications involving liquid compositions benefited or otherwise affected by treating with one or more additive components and the like. Such containers are designed to provide gradual, preferably sustained, and more preferably substantially controlled, release of an additive composition into a liquid composition. Exemplary liquid compositions include, without limitation substantially aqueous liquids; liquids including water and at least one freezing point depressant, e.g., at least one glycol, such as ethylene glycol, propylene glycol and the like glycols; substantially non-aqueous liquids, e.g., liquids based substantially on one or more glycols (for example, containing at least about 50% by weight of one or more glycols); and the like. Substantially any aqueous liquid composition or any non-aqueous liquid composition which can be benefited or otherwise affected by the addition of one or more additive component may be treated using the present containers.

The liquid composition may also be susceptible to unwanted growth of one or more types and/or species of microorganisms. For example, and without limitation, included among such microorganisms are bacteria, fungi, viruses, spores, and the like and combinations thereof. Such microorganisms or microbes may be present in the environment in which the liquid composition is located and/or is employed. In addition, or alternatively, the liquid composition may be such that the additive composition in the present apparatus is effective to substantially prevent any significant growth of one or more particular microorganisms, for example and without limitation, one or more microorganisms that may be introduced into the liquid composition unintentionally or otherwise through human or natural intervention. In other words, the additive composition in the present apparatus may be employed to substantially prevent any microbial growth in the liquid composition, to control the growth of one or more microorganisms in the liquid composition and/or to reduce the population of one or more microorganisms in the liquid composition, for example, a liquid composition which is contaminated with an excessive population or amount of one or more microorganisms. Thus, the present apparatus can be used to substantially prevent microbial growth, to control microbial growth and/or to reduce microbial growth in a liquid composition.

Unless otherwise expressly noted to the contrary, each of the words "include", "includes", "included" and "including," and the phrase "for example" and abbreviation "e.g." as used herein in referring to one or more things or actions means that the reference is not limited to the one or more things or actions specifically referred to.

The present containers comprise a casing, for example, a liquid-insoluble and liquid-impermeable casing, having or defining a substantially hollow interior. The casing has at least one opening. The casing may have any suitable shape and size, which are often chosen to be compatible with the particular application involved. The casing, for example, may have a generally cylindrical shape, a generally bowl shape or any of a large number of other shapes. The casing may have one or more curved and/or planar walls or it can have all curved or planar walls.

The at least one opening in the casing may be provided at any location or locations in the casing. For example, such opening or openings can be located at the top and/or bottom and/or ends and/or side or sides of the casing, as desired. The choice of the location for the opening or openings often is at least partially based on the particular application involved, and/or the ease and/or the cost of manufacturing the present additive composition containers and the like factors and may have at least some effect on the performance effectiveness of the containers.

In order to illustrate and describe the invention more clearly, cylindrically-shaped casings and bowl-shaped casings are emphasized herein. However, the present invention is not limited thereto and is applicable to casings of other shapes. Containers including such other shaped casings are included within the scope of the present invention.

In one embodiment, the casing may be cylindrical in shape, for example, having a first end and a second end. The casing is provided with at least one opening, for example at one or both of the first end and second end and/or in the side wall of the casing. The casing may be substantially bowl-shaped. For example, the bowl-shaped casing defines a hollow interior, a top, bottom and one or more side walls. The opening or openings can be located in the top, bottom and/or one or more side walls.

An additive composition is provided in the hollow interior of the casing. At least one liquid-permeable element is provided at or near at least one opening of the casing. For example, a liquid-permeable element advantageously is provided at or near each such opening of the casing. Such liquid-permeable element or elements are effective to provide for release of a portion of the additive composition into the liquid composition in contact with the casing, for example, in a sustained manner over time while retaining a balance of additive composition within the casing.

The casing of the container may be made of any suitable material or materials of construction. The casing as such has substantially no detrimental effect on the additive composition or the liquid composition or on the performance of the present container. The casing preferably is composed of a material selected from metals, such as steel, aluminum, metal alloys and the like, polymeric materials, combinations thereof and mixtures thereof. In one particularly useful embodiment, the casing is selected from metals, polyvinyl chloride (PVC), polyethylene (high density and/or low density), polypropylene (PP), nylon, polyethylene vinylacetate (EVA), polypropylene vinylacetate (PVA), polyester, acetal, polyphenylene sulfide (PPS), and the like, combinations thereof and mixtures thereof.

In one embodiment, the at least one liquid-permeable element or component of a present container, preferably comprising at least one liquid-permeable membrane, such as a porous or semi-permeable membrane, facilitates or permits contact of liquid composition with the additive composition provided within the casing. The membrane may optionally be accompanied, when desired, by at least one membrane retention member or two or more retention members, for example, an open mesh screen, woven cloth, support grid, for example, included on the casing, and the like, effective in retaining and/or supporting the membrane intact and/or in a substantially fixed position relative to, for example, within, the casing.

The liquid-permeable membrane, membrane component or membrane member, herein sometimes referred to as membrane, of the invention is advantageously composed of a suitable liquid-insoluble material, preferably selected from polymeric materials, glasses, metals, combinations thereof and mixtures thereof. For example, suitable materials include, but are not limited to, glasses, polyamides, such as nylon and the like, cellulosic polymers, such as cellulose acetate and the like, polyesters, polyethylene vinylacetate (EVA), polypropylene vinylacetate (PVA), polyvinyl chloride (PVC), polyurethanes, stainless steel mesh, sintered metals (such as sintered metal discs and the like), metal membrane filters (such as silver membrane filters and the like) and the like, as well as combinations thereof and mixtures thereof. In one embodiment, the membrane comprises a material selected from cellulose; cellulose salts, for example and without limitation, cellulose acetate, cellulose sulfate, cellulose phosphate, cellulose nitrate and the like and mixtures thereof; cellulose esters; polyesters; polyamides, glasses and the like and combinations thereof.

The membrane can alternatively be a material through which an additive composition can pass, for example, by diffusion (although not necessarily through pores), such as silicone rubber, polyethylene, polyvinylacetate, natural and synthetic rubbers, and other polymers and waxes, and combinations thereof and mixtures thereof. Such membranes are often referred to as semi-permeable membranes. In one embodiment, a "semi-permeable membrane" refers to a continuous film of a material, for example and without limitation, a polymeric material, permeable to the liquid composition, which permits diffusion of molecules through microscopic channels. The pore size of such a semi-permeable membrane is not easily measured and is typically less than about 0.2 microns.

The liquid-permeable membrane of the present invention preferably comprises a porous membrane, advantageously a microporous membrane, such as those membranes having an average pore size within the range of about 0.2 microns or about 1 micron or about 2 microns to about 30 microns or about 40 microns to about 300 microns or more. As referred to herein, a "membrane" may be a single layer or may include multiple plies. The thickness of the membrane is preferably in a range of about 0.1 mm or less to about 0.5 mm or about 1 mm or about 5 mm or about 10 mm or more, although other thicknesses can be effectively employed. Examples of membrane materials include metal wire meshes; polymers, such as polyamides, e.g., nylon and the like, other polymers disclosed elsewhere herein and the like, meshes; filter media; and the like; combinations thereof; and mixtures thereof. Useful membrane materials include materials useful as filter media, reverse osmosis (RO) membranes and the like, combinations thereof and mixtures thereof. Examples of such materials include the filter media available from Whatman, Millipore, Alhstrom, Parker Hannifin, Sartorius, as well as from others.

The presence of and/or size of pores in the liquid-permeable membranes employed in accordance with the present invention may not be the controlling factor in determining the rate of release of the additive composition into the liquid composition. Other factors which may be important, or at least have an effect, in determining the rate of release of additive composition into the liquid composition include, but are not limited to, the membrane material of construction, the physical dimensions (for example, thickness, volume and the like) of the membrane, the presence and/or intensity (density) of the electrical charge, if any, on the membrane material, the additive composition being employed, the degree of hydrophilicity/hydrophobicity of the membrane material, the form of the additive composition and the like.

To illustrate, each of two membranes having the same physical dimensions is used in identical containers containing the same amount of the same additive composition in accordance with the present invention. Each container is used to release the additive composition from the container into water in an identical manner and the rate of release of the additive composition is measured. One membrane is formed of cellulose, an electrically charged material, having an average pore size of 20-25 microns. The other membrane is formed of electrically uncharged glass having an average pore size of only 5 microns. However, the glass membrane, having the smaller pores, is found to have a higher or increased additive composition release rate relative to the electrically charged cellulose membrane.

Thus, a number of factors may be considered in choosing or selecting the membrane material to be used in accordance with the present invention to achieve the desired additive composition release rate. In one embodiment, the material of construction of the membrane and the pore size of the membrane are selected to control the rate of release of the additive composition into the liquid composition.

The additive composition release flux rate through the membrane is defined as milligrams of additive composition released per hour through one square millimeter of membrane or mg./hr./mm². Because the release flux rate varies over a wide range and is at least sometimes relatively slow, a test using benzyltriazole has been developed to quantify certain release flux rates that may be useful in accordance with the present invention. This test is conducted as follows.

A tank with twenty (20) gallons of tap water is provided, together with a recirculating heater to give mixing and temperature control. The temperature is set to 80° F. Once this temperature is reached, a container, such as shown in FIG. 1, containing benyzyltriazole is placed in the tank in contact with the water. Water samples are collected at regular intervals over a 100 hour period and are measured for benzyltriazole content. From these measurements, the benzyltriazole release flux rate of the membrane is determined. To illustrate, suppose 300 mg of benzyltriazole is released through 351 mm² of membrane area (exposed through an opening in the outermost wall of the container) in 100 hours. The benzyltriazole release flux rate $$\frac{300}{100 \times 351}$$

or 0.0085 mg./hr./mm².

Useful benzyltriazole release flux rates for membranes in accordance with the present invention may be in a range of about 0.001 or less to about 0.3 mg./hr./mm² or more, for example, in a range of about 0.002 to about 0.2 mg./hr./mm².

It should be noted that benzyltriazole release flux rates may be employed as one measurement of whether or not a membrane is useful in accordance with the present invention. However, the benzyltriazole release flux rate is not the only basis on which the usefulness of a particular membrane can be measured, determined or estimated. For example, prototyping may be employed, and other tests using the actual membrane and/or actual additive composition to be used may be employed. Benzyltriazole release flux rates which are either too high or too low do not necessarily preclude the membrane tested from being useful in accordance with the present invention. There may be additive compositions that do not release sufficiently through membranes that have benzyltriazole release flux rates which are considered acceptable, or that release sufficiently through membranes that have benzyltriazole release flux rates which are not considered acceptable. In any event, within the limitations noted above, the benzyltriazole release flux rate has been found to be one useful tool in determining the suitability of membrane materials in the present invention.

In the event that a selected material is insufficiently rigid or stable under the conditions at which the present apparatus are used, for example and without limitation, the repeated hot-cold cycling of a cooling system or other system in which the apparatus is employed, a more thermoresistant material, such as one made of ceramic, glass and the like, combinations thereof and mixtures thereof, can be employed as a membrane material of construction.

The membrane may be secured to the casing so as to cover the opening or openings in the casings, for example, so that no additive composition passes outside the casing without passing through the membrane. The membrane advantageously is positioned in and/or directly adjacent the opening or openings in the casing. The membrane may be secured or fixedly secured to the casing, for example, adhering the membrane to the casing using an appropriate and compatible adhesive; mechanically securing the membrane to the casing, for example and without limitation, press fitting or interference fitting the membrane to the casing, such as by fastening the membrane between two parts of the casing which fastening is achieved by friction after the parts are brought toward each other; co-molding the membrane with the casing; otherwise securing, for example, fixedly securing, the membrane to the casing; and the like.

In one embodiment, the casing defines only one opening in an outermost wall of the casing and the membrane is provided in or directly adjacent the only one opening.

As noted above, in one embodiment, the liquid-permeable element further comprises at least one retention member. For example, the membrane may be retained across the opening of the casing by one or more wire or mesh screens, for example, stainless steel mesh screens, grid work on the casing and the like. The membrane may be sandwiched between the casing and the retention member or between at least two retention members. The retention members preferably are structured, for example, so as to have a mesh size, to facilitate or permit additive composition from the casing to be passed, for example, by diffusion, into the liquid composition in contact with the container. For instance, the retainer member or members preferably have a mesh size in the range of about 10 to about 300 microns or about 500 microns or more. A particularly preferred retention member is metal, e.g., stainless steel screening and/or woven cloth. The retention member or members may be made of the same material as the casing or of a different material relative to the material of construction of the casing.

The additive composition provided within a container of the invention may be effective when released into the liquid composition to control, for example substantially prevent, substantially maintain, or reduce, corrosion or unwanted microbial growth in the liquid composition. The additive composition may be provided in the form of a liquid, gel, paste or solid particles, for example, beads, tablets, pellets or grains, and the like, as well as mixtures thereof, within the casing.

An additive composition of the invention can advantageously further comprise a coating material that at least partially surrounds or encapsulates or coats the additive composition, as discussed elsewhere herein. Such coating material may be provided in order to at least assist in controlling, or to control, the release of additive composition, as desired. The coating material may be either liquid-soluble or liquid-insoluble. The coating on the additive composition should be such as to allow or permit at least some release of the additive composition from the casing into the liquid composition.

The additive composition of the present invention may include or may be located in a binder material and/or a matrix material, for example, a liquid-insoluble biocide material and/or matrix material, such as a liquid-insoluble polymeric material. Examples of such binder materials and matrix materials include, without limitation, cellulose, liquid-insoluble cellulosic derivatives and the like and mixtures thereof. Other binder and matrix materials, advantageously liquid-insoluble binder and matrix materials, useful with additive compositions, for example and without limitation, conventionally and/or commercially used with additive compositions may be employed in or with the additive composition of the present invention. The binder material and/or matrix material, if any, should be such as to allow or permit release of the additive composition from the casing into the liquid composition. The binder material and/or matrix material advantageously is effective to at least assist in controlling, or to control, the release of the additive composition into the liquid composition. In one embodiment, the additive composition may be present in the casing and no binder material and/or matrix material is employed.

In one embodiment, as discussed herein, the liquid-permeable element or elements include a polymer-containing membrane, for example, a polymer-coated membrane, in order to achieve enhanced additive composition release control. In this latter aspect, the membrane, that is the membrane of the liquid-permeable element or elements, is suitably coated, impregnated or otherwise associated, for example, by spray coating, dip coating and the like, with a polymer material. Suitable polymer materials include without limitation, liquid-insoluble materials which have no significant detrimental effect on the liquid compositions being treated, on the additive composition or on the performance of the present container. Examples of such coating materials include those listed by Mitchell et al U.S. Pat. No. 6,010,639, the disclosure of which is incorporated in its entirety herein by reference. In one embodiment, the polymer material is polyethylene vinyl acetate copolymer. In addition, or alternatively, the present retention member(s) of the liquid-permeable element or elements can be coated, impregnated, or otherwise associated with a material, for example, a coolant-insoluble polymer material, such as those disclosed in Mitchell et al U.S. Pat. No. 6,010,639, to at least assist in controlling or to control, release of the additive composition from the casing, as desired. Other examples of useful coatings are disclosed in Blakemore et al U.S. Pat. No. 6,878,309, the disclosure of each of the patents identified herein is incorporated in its entirety herein by reference.

The container of the present invention preferably is filled with an additive composition through the opening or openings of the casing or otherwise.

The containers of the invention, for example, the casings of the containers, may include one or more liquid-impermeable cap members or liquid-impermeable plugs, which can be detachable or removable from the casing or the remainder of the casing, for example, to facilitate filling the interior space of the casing with an additive composition.

In a useful embodiment, the containers of the present invention, for example, the casings of the present containers, may further include a further opening, for example, at least one further opening, into the hollow interior; and the containers may further comprise a structure operatively coupled to the further opening or openings. The further opening or openings are positioned to allow air to pass out of the hollow interior of the casing through the further opening or openings. The above-noted structure may be operable to allow at least one or both of the following: (a) air to pass out of the hollow interior through the further opening or openings; and (b) a liquid composition, for example, an aqueous-based liquid or water, to pass into the hollow interior through the further opening.

In another useful embodiment, the containers of the present invention, for example, the casings of the containers, may further include a further opening, for example, at least one further opening, into the hollow interior, as noted above, and may further comprise a structure operatively coupled to the further opening or openings and operable to allow air to pass out of the hollow interior through the further opening and to substantially prevent a liquid composition from passing out of the hollow interior through the further opening. In another useful embodiment, the structure is operable to substantially prevent a liquid composition from passing into the hollow interior through the further opening or openings. In one embodiment, the structure is effective to allow gaseous material, such as air, present in the hollow interior to escape through the further opening or openings. Liquid, e.g., liquid water, may be allowed to enter the hollow interior through the further opening or openings, for example, during the period in which liquid initially fills the hollow interior. The escape of anything else, that is other than air or other gaseous material, originally contained in the hollow interior, for example, the additive composition, occurs through the control membrane or membranes covering the opening or openings and not through the structure associate with the further opening or openings.

Such containers are very useful in applications in which a liquid composition, such as an aqueous-based liquid, liquid water and the like, is to be passed into the hollow interior of the container to facilitate release of the additive composition into the liquid composition external from and/or in contact with the casing. In other words, the further opening or openings and structure, as described herein, facilitate allowing and/or are effective in allowing air to leave the hollow interior while a liquid, such as described herein, enters the hollow interior.

In one embodiment, the structure comprises a removable plug structured to be placed in the further opening to close the further opening. For example, the container may include a removable plug in a further opening or port in the casing, which plug can be removed to allow a liquid, such as an aqueous-based liquid, liquid water and the like, to be introduced into the hollow interior through the further opening or openings to wet the additive composition.

Certain additive compositions are hydrophobic or otherwise resist wetting by the liquid composition in contact with the container. In such instances, it is advantageous that water, or other aqueous or non-aqueous liquids, be directly introduced into the hollow interior to wet or otherwise interact with the additive composition and facilitate the initial release of the additive composition into the liquid composition. In other words, without such direct introduction of water or liquid composition, the additive composition in the hollow interior resists wetting by or interaction with the liquid composition in contact with the casing for an overly long period of time so that, during this long period of time, no additive composition is released into the liquid composition. In effect, pre-wetting or pre-conditioning such additive compositions allows for a reasonably prompt, and controlled release of the additive compositions into the liquid composition in contact with the housing.

Once the water or liquid has been directly introduced into the hollow interior, the plug is repositioned in the further opening to close the further opening.

The structure may comprise a valve operable between a first position to allow air to pass out of the hollow interior through the further opening and a second position to substantially prevent air from passing out of the hollow interior through the further opening. As air leaves the hollow interior, liquid, for example, as noted elsewhere herein, may be introduced into the hollow interior, for example, through the further opening, to displace the air that has been removed. The valve may be located substantially within the hollow interior or substantially external of the hollow interior or both within the hollow interior and external of the hollow interior.

Any suitable valve may be employed as the structure in accordance with the present invention. Such valve should be operable and effective at the conditions at which the container is used, and should be made of materials which are compatible, that is materials which do not cause or create or have any undue or significant detrimental effect on the container during storage or use or on the liquid composition being treated. Examples of useful valves include, without limitation, ball float valves, spring loaded valves, duck bill valves, umbrella valves and the like. The valve may be adjustable so that the internal pressure within the hollow interior, for example, produced by liquid entering the hollow interior can be controlled by adjusting the valve to obtain a desired internal pressure before the valve is opened to allow air to leave the hollow interior through the further opening in the casing.

In one embodiment, the structure may comprise an air permeable membrane member positioned over the further opening or openings. The air permeable membrane member is structured and positioned to allow air to pass out of the hollow interior through the further opening and to substantially prevent a liquid, such as, for example, an industrial liquid composition, a liquid composition susceptible to microbial growth, etc., from passing out of the hollow interior through the further opening.

The air permeable membrane member may be positioned in or covering the further opening or openings, for example, using adhesives and/or other attachment means and/or by being interference fitted in the further opening. The air permeable membrane member may be co-molded with the casing or a portion of the casing.

The air permeable membrane member may be made of a material and/or may have properties such that the air permeable membrane member allows air to escape the hollow interior but not liquid compositions, for example, as described elsewhere herein. For example, the air permeable membrane member may be made of a non-wetting material and/or have a size and porosity sufficiently lower than the liquid permeable membrane described elsewhere herein to effectively not contribute to the release of the additive composition through the air permeable membrane member. For example, the liquid permeable membrane may have a porosity of about 20 to about 30 microns and an area of about 40 to about 60 $cm^2$, and the air permeable membrane member may have a porosity of about 1 to about 10 microns and an area of about 1 to about 10 $cm^2$.

The air permeable membrane member may be made of any suitable material, for example, sufficiently durable to be effective in use with the present container and compatible with the remainder of the container and the liquid composition being treated.

In a further embodiment, with the container including an opening, primarily for the release of additive composition into the liquid composition and a further opening, the same membrane material may be used to cover both the opening and the further opening. For example, and without limitation, in a case where 51 $cm^2$ of total area is needed to get the desired release of the additive composition from the hollow interior, the opening would be larger, such as at least about 5 times larger in area, for example, about 45 $cm^2$, than the further opening, for example, about 6 $cm^2$. In this embodiment, it would be advantageous to place the larger opening below or down stream of the smaller, further opening. In this embodiment, the membrane material employed to cover both the opening and the further opening advantageously is suitable as a material for the liquid permeable membrane member.

In one embodiment of the present invention wherein the casing is substantially cylindrical shaped and the opening or openings are located at the end or ends of the casing, one or both ends of the casing may include a cap member, with at least one of the cap members being removable to allow the casing or cartridge to be filled, or refilled, in those cases in which the casing is structured to be refilled, with an additive composition. Another open end of the casing, if desired, may include a cap member that is permanently sealed thereto, for example, during manufacture, for example, during injection molding of the container. Whenever the cap or plug is attached by threading or screwing it onto the casing, screw threads can be applied to the respective pieces during or after molding with suitable dies or within the mold. The cap member can alternatively be applied to the casing by a press fit. In this case, suitable tolerances to make a snap fit between the casing and the end piece can be provided, for example, to the plastic injection molds used to make the respective pieces. The end piece can also be formed integrally with the casing, e.g., during injection molding.

The cap or end piece or end portion used to close at least one end of the casing containing the additive composition typically is provided with at least one opening to permit release of the additive composition therethrough, and to provide fluid communication between the liquid composition located exterior to the container and the additive composition disposed within the casing interior. Whenever an end piece or end portion is formed integrally with the casing, the opening can be provided therein during or after formation of the casing, for example, by injection molding.

It will be appreciated by those of skill in the art that release of the additive composition into a liquid composition utilizing a container of the present invention is provided, and the release rate may be substantially controlled by consideration of several factors. The following factors, as well as others, may also have an effect on the performance and effectiveness of the containers of the present invention. For example, a desired additive composition release rate may be obtained by appropriate selection of: the number and type of membrane layers; membrane composition; membrane pore size, if any; the presence, type and amount, if any, of polymer associated with, e.g., coated, on the membrane; and the presence, type and amount, if any, of the coating on the additive composition. The rate of release may also be influenced by the number and size of openings in the casing and the like. Other factors to be considered include, among others, the type and form of the additive composition, the solubility of the additive composition in the liquid composition to be treated, the temperature of the liquid composition to be treated, and the velocity of the liquid composition through the liquid composition line or system to be treated and the like factors.

Further contemplated within the invention is a method for releasing an additive composition, preferably at a controlled rate, into a liquid composition. The method comprises placing in contact with the liquid composition a container or cartridge as described herein containing the additive composition. The container or cartridge configuration described herein preferably permits a release, preferably a controlled release, of additive composition from the casing interior into the liquid composition. It is contemplated that, in some configurations, the liquid composition is permitted to flow around and encircle the casing containing the additive composition. However, even in these configurations, release of additive composition is preferably sustained and/or controlled, for example, by diffusion, for example, passive diffusion, rather than by forced flow of liquid composition through the casing.

In one embodiment of the present invention, the liquid composition, after release of the additive composition into the liquid composition using containers of the present invention, is not potable.

An additive composition for use in a container or cartridge of the invention preferably is provided as a liquid, gel, paste or as particles, for example, beads, tablets, pellets, grains, coated versions of these, and the like, as well as mixtures thereof. The particles have a physical size large enough to prevent passage through the liquid-permeable components of the invention as described elsewhere herein.

As mentioned elsewhere herein, an additive composition comprising a chemical additive component for use with the present invention is such as to be effective to serve some beneficial function within the liquid composition. In one embodiment, the additive composition can include one or more of an anti-fouling agent, a pH buffering agent, a surface pitting inhibitor, a metal corrosion or hot surface corrosion inhibitor, a defoaming agent, a scale inhibitor, a hot surface deposition inhibitor, a dispersing agent, a surfactant, a microbiocide and the like, and mixtures thereof. One very useful additive composition is a combination of ammonium or alkali metal salts of nitrite, nitrate and molybdate ions, particularly a combination of sodium nitrite, sodium nitrate, and sodium molybdate. Additional additives include, for instance, ammonium or alkali metal salts, for example, phosphate salts, borate salts, silicate salts, acidic salts, basic salts and the like and mixtures thereof. Further additives that can be used with the present invention are found in Mitchell et al U.S. Pat. No. 6,010,639, the disclosure of which is incorporated herein in its entirety by reference.

In one embodiment, the additive composition comprises one or more of the following: (1) buffers to maintain the desired degree of acidity/alkalinity, e.g., a neutral or alkaline pH, including for example, alkali metal phosphates, borates and the like and mixtures thereof; (2) cavitation liner pitting inhibitors including alkali metal nitrites, molybdates and the like and mixtures thereof; (3) metal corrosion inhibitors and/or hot surface corrosion inhibitors including alkali metal nitrates and silicates, carboxylic acids, phosphonic acids, phosphonates, pyrophosphates, azoles, sulfonic acids, mercaptobenzothiazoles, metal dithiophosphates, metal dithiocarbonates, phenolic anti-oxidants including 4,4'-methylenebis (2,6-di-tertbutylphenol that is commercially available under the trademark Ethyl 702 by Ethyl Corporation) and the like and mixtures thereof; (4) defoaming agents including silicone defoamers, alcohols such as polyethoxylated glycol, polypropoxylated glycol, acetylenic glycols and the like and mixtures thereof; (5) hot surface deposition inhibitors and/or scale inhibitors including phosphate esters, phosphino carboxylic acids, polyacrylates, styrene-maleic anhydride copolymers, sulfonates and the like and mixtures thereof; (6) dispersants including non-ionic and/or anionic surfactants, e.g., phosphate esters, alkyl sulfonates, aryl sulfonates, alkylaryl sulfonates, linear alkyl benzene sulfonates, alkylphenols, ethoxylated alcohols and carboxylic esters, and the like and mixtures thereof; (7) organic acids including adipic acid, sebacic acid and the like and mixtures thereof; (8) anti-gel agents including those disclosed in Feldman et al U.S. Pat. No. 5,094,666, the disclosure of which is incorporated in its entirety herein by reference, copolymers of ethylene and vinyl esters of fatty acids with molecular weights of 500-50,000, tallow amine salts of phthalic anhydride, tallow amine salts of dithio benzoic acid, 4-hydroxy,3,5-di-t-butyl dithiobenzoic acid, ethylene vinylacetate copolymers and the like and mixtures thereof; and (9) microbiocides, preferably microbiocides used in cooling towers, including those disclosed in Sherbondy et al U.S. Pat. No. 5,662,803, the disclosure of which is incorporated in its entirety herein by reference, and the like and mixtures thereof.

The additive compositions useful in the present invention may include one or more of the agents listed in the following Table 1. The possible functions of the agents identified in Table 1 are only intended to be exemplary, not limiting.

TABLE 1

| COMPONENT | POSSIBLE FUNCTION | TYPICAL % BY WT. IN ADDITIVE COMPOSITION |
|---|---|---|
| Alkali metal or Ammonium phosphates | corrosion inhibitor/ buffering agent | 0-80 |
| Alkali metal or ammonium phosphonate | corrosion inhibitor/ buffering agent | 0-80 |
| Alkali metal or ammonium pyrophosphate | corrosion inhibitor/ buffering agent | 0-80 |
| Alkali metal or ammonium borate | corrosion inhibitor/ buffering agent | 0-80 |
| Alkali metal or ammonium nitrites | cavitation liner pitting/corrosion inhibitor | 4-60 |
| Alkali metal or ammonium molybdates | cavitation liner pitting/corrosion inhibitor | 4-60 |
| Alkali metal or ammonium nitrates | corrosion inhibitor | 4-60 |
| Alkali metal or ammonium silicates | corrosion inhibitor | 0-40 |
| Alkali metal or ammonium salts of one or more neutralized dicarboxylic acids | corrosion inhibitor | 1-15 |
| Tolyltriazole | corrosion inhibitor | 1-15 |
| Dispersants (e.g. polyacrylic acid, phosphino carboxylic acid, phosphate esters, styrene-maleic anhydride copolymers, polmaleic acid, sulfonates and sulfonate copolymers) | deposition and scale inhibitors | 0-15 |
| Defoamers (e.g. silicones, polyethoxylated glycol, polypropoxylated glycol, acteylenic glycols) | foam inhibitor | 0-3 |

In one embodiment, the additive composition includes nitrite compounds. The additive composition may include a mixture of nitrite compounds and molybdate compounds to maintain a minimum concentration level of about 800 ppm of nitrite or of nitrite and molybdate in the coolant in the cooling system, with the proviso that the minimum level of nitrite in the coolant system is often about 400 ppm. In another embodiment of the present invention, the additive composition includes a mixture of nitrite, nitrate and molybdate compounds. A useful additive composition may comprise one or more of nitrite, nitrate, phosphate, silicate, borate, molybdate, tolyltriazole, organic acid, scale inhibitor, surfactant and defoamer. Various other additive components and additive compositions are conventional and/or well known in the art. Such conventional/well known components/compositions may be used in the present containers and methods.

In one embodiment, the additive composition is effective in controlling microbial growth in the liquid composition, and/or in the system in which the liquid composition is used or employed. As noted elsewhere herein, the additive composition may be effective in preventing unwanted microbial growth in the liquid composition and/or system, in reducing unwanted microbial growth, that is reducing the population of unwanted microbes, in the liquid composition and/or system, and/or in maintaining the population of unwanted microbes in the liquid composition and/or system at an acceptable or tolerable level. In short, the additive composition has an effect on the population of unwanted microbes in a liquid composition and/or a system using or employing a liquid composition relative to the population of such microbes in an identical liquid composition and/or system without the additive composition being present.

Advantageously, the additive composition is compatible with the container or cartridge, and its component parts, in which it is placed, with the liquid composition to be treated, and with the system in which the liquid composition is used or employed. For example, and without limitation, the additive composition may be selected so as not to be unduly degraded or damaged by, and not to cause undue degradation or damage to, the container, the liquid composition to be treated and the system in which the liquid composition is used or employed.

The containers or cartridges of the present invention can be placed in a liquid composition filter, either upstream or downstream of the filter medium, or it can be placed in the system in which the liquid composition is used or employed separate and apart (spaced apart) from the liquid composition filter, or it can be provided in a substantially fixed position in the liquid composition line, either upstream or downstream of a liquid composition filter. Release of an additive composition into the liquid composition is governed, at least in part, by one or more of membrane pore size, membrane thickness, membrane composition, surface area of the membrane, viscosity of liquid additive composition, surface tension and membrane wetting ability of the additive composition and/or liquid composition, liquid composition system operating conditions, such as temperature, pressure and the like, and the like factors.

The invention will now be described with reference to certain examples, which illustrate but do not limit it.

Example 1

Referring now to FIG. 1, container 10 comprises a PVC casing 12 including a solid, open ended, generally cylindrically shaped casing body 13 and an end cap 14, which are fitted onto the casing body using a pair of pegs 16, inwardly extending from an end 17 of the cap 14, fitted into an annular groove 18 in the outer sidewall 19 of the casing body. The casing body 13 has an open end 20 and an opposing closed end 21. The casing 12 defines a hollow interior 22.

Provided within the hollow interior 22 are particles 24 containing an additive composition comprising a mixture of conventional corrosion inhibitors, scale inhibitors and defoamers, such as the composition sold by Fleetguard under the trademark DCA-2. The coolant composition to be treated using container 10 is an industrial aqueous liquid composition, for example, an aqueous-based liquid coolant used in a cooling tower.

A porous membrane 27 is adhered to the inner wall 28 of the end cap 14 and covers an opening 30 provided in the end cap. The membrane 27 is made of cellulose nitrate and has an average pore size in a range of about 20 to about 25 microns. The benzyltriazole release flux rate, as defined herein, of the membrane 27 is about 0.049 mg/hr/min$^2$. The adhesive used to adhere the membrane 27 to the end cap 14 is such as to be insoluble and remain effective as an adhesive in the liquid composition to which the membrane is to be exposed. The adhesive should also be compatible with such liquid composition and the additive composition present in container 10, for example, have no significant or undue detrimental effect on such liquid composition or on the additive composition or on the other components of container 10. Examples of useful adhesives include, without limitation, epoxy resins; phenolic resins; acrylic resins; cyanoacrylate resins; silicone adhesives; polyurethane adhesives; hot melt adhesives, such as poly(ethylene vinyl acetate (EVA)), polyamide resins, polyester resins and the like; contact adhesives, such as those based on rubber, styrene resins and the like; and the like and combinations thereof.

The container 10 may be placed in a bag or other protective enclosure or packaging for shipment/storage.

The opening 30 in end cap 14 may have a diameter which varies over a relatively wide range, for example in a range of about 1 mm or less to about 50 mm or 80 mm or more. In one embodiment, the opening has a diameter in a range of about 2 mm to about 20 mm or about 40 mm, for example, about 8 mm to about 10 mm. Of course, the opening need not be circular, but can be other shapes, for example, square, rectangular, polygonal, etc. Advantageously, openings with other than circular configurations may have areas which substantially correspond to circular openings having diameters as noted herein; in particular, in a range of about 0.7 mm$^2$ or less to about 2000 mm$^2$ or 5000 mm$^2$ or more; or about 3.2 mm$^2$ to about 350 mm$^2$ or about 1250 mm$^2$, or about 50 mm$^2$ to about 80 mm$^2$. The opening 30 in the end cap 14 permits infiltration of coolant composition and contact with the porous membrane 27 in the casing 12. Release of the additive composition from the particles 24 through the membrane 27 by diffusion permits incorporation of the additive composition into the coolant composition and its circulation throughout the coolant system, that is, the cooling tower system.

Liquid-permeable, porous membrane 27 is effective to be wetted by the coolant composition and to permit additive composition from particles 24 to exit container 10.

In addition, a removable plug 32 is located in port 34 of casing body 13. The plug 32 is structured to be removed to allow water or liquid composition to be introduced directly through port 34 into the hollow interior 22 of the casing 12 to contact and wet the particles 24 of additive composition contained therein. Such water or liquid composition introduction directly into the hollow interior 22 is particularly advantageous in situations in which the additive composition is resistant to being wetted by the liquid composition in contact with the container 10. Other means for introducing water or liquid composition into the hollow interior 22 to achieve such pre-wetting of the additive composition may be employed. For example, water or liquid composition can be injected into the hollow interior 22 through a needle or similar device. Other systems for passing water or liquid composition through the membrane into the hollow interior 22 may be employed. In the event such other means of pre-wetting the additive composition in hollow interior 22 are employed or no pre-wetting of the additive composition is desired, the casing body 13 need not include port 34 and plug 32.

For a container 10, six (6) inches in length having a 1.5 inch inner diameter, the amount of additive composition particles 24 inside the casing is about 186 mL or about 175 g. Release of effective amounts of additive composition starts in less than about 24 hours.

In one embodiment, the container 10 is structured so as not to be refillable with additive composition. For example, and without limitation, the casing body 13, may be made of a lightweight and/or thin polymeric material, such as a thermal plastic polymeric material, which is flexible and/or sufficiently deformable so that, as the additive composition is released from the casing body into the liquid composition, the casing body collapses, and remains collapsed. Such a collapsible casing body effectively prevents the refilling of the casing body with additive composition.

Such a collapsible casing body is a substantial safety feature in accordance with the present invention. Thus, the presently useful additive compositions, or at least one or more additive components included in such additive compositions are often toxic, for example, as particles in an undiluted state, so that great care must be taken in handling such materials to avoid serious harm to the person or people handling the additive composition. By using a collapsible casing or casing body, it becomes clearly evident that such collapsed casing or casing body cannot be refilled with additive composition. Therefore, the user does not even attempt to refill the casing with additive composition, and, therefore, avoids the danger or risk of being seriously harmed or injured by the additive composition.

Example 2

Figure 2:
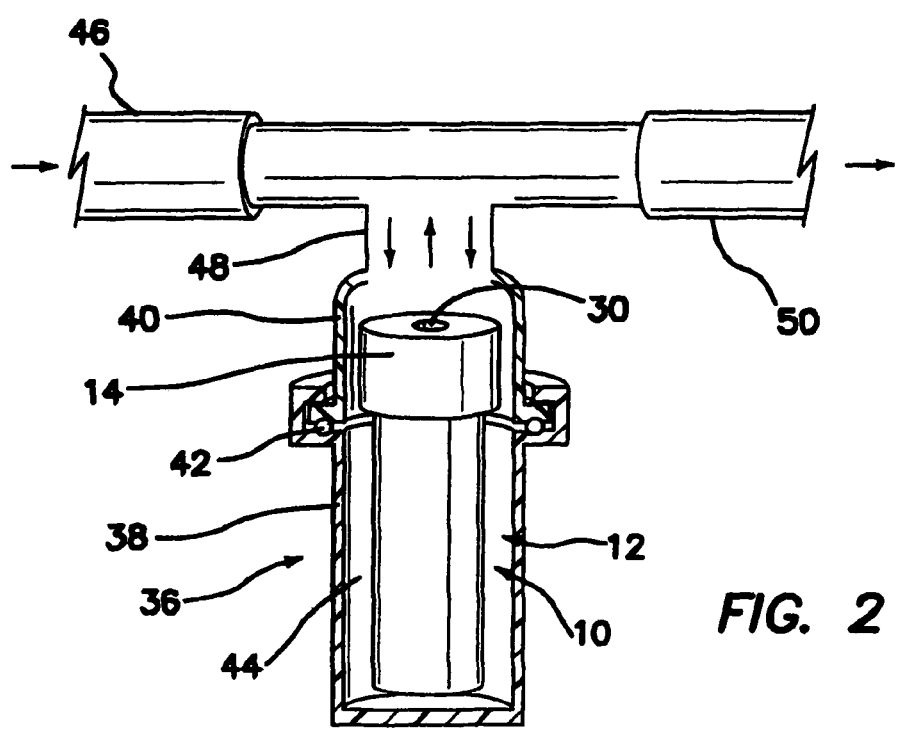
FIG. 2 is a schematic illustration showing the container of FIG. 1 in use in conjunction with a liquid line.

As shown in FIG. 2, container 10 (as shown in FIG. 2) is positioned in vertical alignment with cylindrical housing 36 provided in a "bypass" configuration with a coolant system, for example, a cooling tower system. A representative diameter for the opening 30 in end cap 14 is 9 mm. As shown, housing 36 includes a housing body 38 and a housing top 40 which interlock to secure the container 10 within the housing 36. A housing O-ring seal 42 is provided between housing body 38 and housing top 40 to seal the interior space 44 of housing 36.

Coolant (liquid composition) flows from inlet line 46, enters and exits housing 36 through pipe segment 48, and exits via exit line 50. While inside housing 36, coolant passes in and out of opening or orifice 30, wetting membrane 27 and causing the release, for example, through diffusion, of additive composition from the particles 24 in casing 12 into the coolant. Generally, the liquid coolant flows into the inlet line 46 by the action of a coolant pump (not shown) of the coolant system, it being understood that gravity may also play a role. In addition, a coolant filter element (not shown), for example, of conventional and well known design, may be located in exit line 50. It is understood that such filter element could alternatively be located in inlet line 46. Such alternative is included within the scope of the present invention.

In addition, as shown in FIG. 2, the container 10 is situated in the housing 36 with the opening or orifice 30 facing upward, toward the pipe segment 48. Such an upward orientation is particularly useful if the particles 24 are coated and/or otherwise include a delayed release component to control or at least assist in controlling the release of the additive composition from the container. Alternately the container 10 can be situated in the housing 36 so that the opening or orifice 30 is facing downward or away from the pipe segment 48. This downward orientation is useful when the additive composition in the particles 24 is not coated or combined with a delayed release component. Both the upward and downward orientations of the container 10, as well as side-to-side and other orientations of container 10, are included within the scope of the present invention.

Example 3

Figure 3:
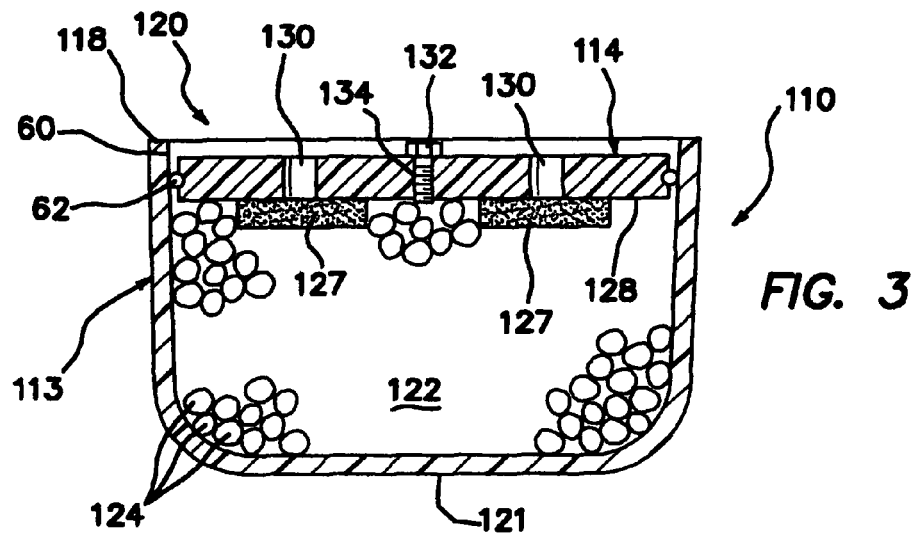
FIG. 3 is a cross-sectional view of an additional embodiment of an additive composition container in accordance with the present invention.

Turning now to FIG. 3, an additional container 110 of the present invention is shown. Except as expressly described herein, additional container 110 is structured and functions substantially similarly to container 10.

The container 110 generally comprises a bowl-shaped, liquid-impermeable casing body 113 having a hollow interior 122 filled with particles 124 of an additive composition, for example, as described in Example 1. The casing body 113 has a relatively wide open top end 120 which is, for example and without limitation, circular in shape, and an opposing closed end 121. The container 110 further comprises a cap member 114 disposed across, and preferably substantially completely covering, the open end 120.

The container 110 is useful in a coolant (liquid composition) line or a coolant sump, for example, of a cooling tower system (not shown). For example, container 110 may be placed in the coolant line, for example, in a manner analogous to that shown in FIG. 2, or in a coolant sump.

In the container 110 shown in FIG. 3, the cap member 114 is removably secured to the casing body 113 in order to allow for filling and/or refilling of the container 110 with the particles 124 of additive composition. As shown, the cap member 114 may be recessed from a periphery, or rim 118, of the casing body 113.

The cap member 114 may be secured to an interior surface 60 of the casing body 113 by means of a resilient O-ring 62 or the like.

The cap member 114 includes at least one opening 130, preferably a plurality of openings 130, for example, four inlets 130 in the embodiment in FIG. 3, to allow a liquid coolant composition in contact with the container 110 to wet the porous membrane layers or pads 127. In this embodiment, the membrane layers 127 are made of cellulose nitrate having a pore size of about 8 microns, and a benzyltriazole release flux rate, as defined herein, of about 0.025 mg/hr./mm$^2$.

The membrane filter member layers or pads are adhered to inner wall 128 of the cap member 114. Each layer or pad 127 covers a different opening 130 provided in the end cap. The adhesive used may be as described elsewhere herein. The membrane layers or pads 127 are provided for controlling release of the additive composition from particles 124 into the coolant.

In addition, a removable plug 132 is located in port 134 of cap member 114. The plug 132 is structured to be removed to allow water or liquid composition to be introduced directly through port 134 into the hollow interior 122 of the casing 112 to contact and wet the particles 124 of additive composition contained therein. Such water or liquid composition introduction directly into the hollow interior 122 is particularly advantageous in situations in which the additive composition is resistant to being wetted by the liquid composition in contact with the container 110.

Container 110 functions in a manner substantially analogous to container 10, and is effective to release additive composition from the container into the liquid coolant composition. A coolant pump and a coolant filter element may be employed in this embodiment in a manner analogous to that described in Example 2.

Example 4

Figure 4:
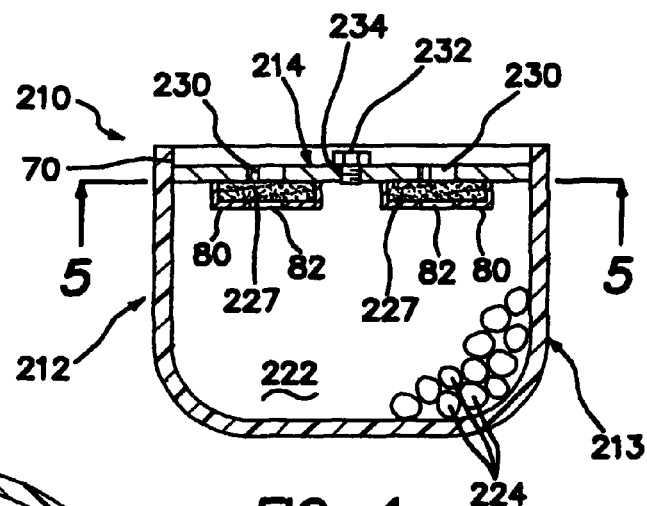
FIG. 4 is a cross-sectional view of another embodiment of an additive composition container in accordance with the present invention.
Figure 5:
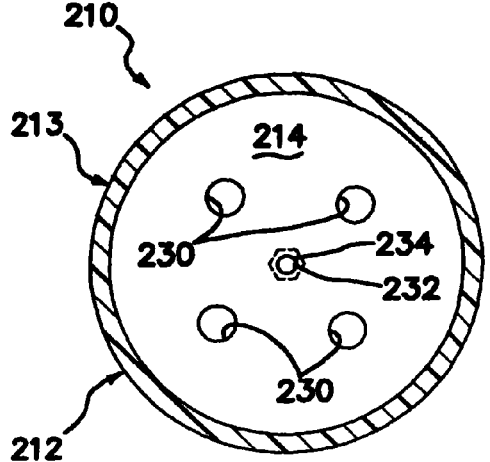
FIG. 5 is a view taken generally along the line of 5-5 of FIG. 4.

FIGS. 4 and 5 show another container 210 of the present invention that, except as expressly described herein, is structured and functions substantially similarly to containers 10 and 110.

The container 210 generally comprises a bowl-shaped casing body 213 defining a hollow interior 222 for containing particles 224 of an additive composition, for example, as described in Example 1. In addition, an aluminum plate member 214 is secured to the inner wall 70 of casing body 213 for retaining the additive composition particles 224 within the casing 212. The aluminum plate member 214 includes a plurality of openings 230, for example, four openings 230 as shown in FIGS. 4 and 5. The four openings 230 are arranged in a configuration similar to how the four openings 130 in container 110 are arranged.

Four individual support structures 80 are secured to plate member 214 directly below each of the openings 230. Each of these structures 80 has a through opening 82 and, together with the plate member 214, defines a compartment sized to accommodate a porous membrane segment 227 between the plate member 214 and the through opening 82. The porous membrane segments 227 are, thus, press fitted to plate member 214. Each of the membrane segments 227 covers a different one of the openings 230.

In addition, a removable plug 232 is located in port 234 of casing 212. The plug 232 is structured to be removed to allow water or liquid composition to be introduced directly through port 234 into the hollow interior 222 of the casing 212 to contact and wet the particles 224 of additive composition contained therein. Such water or liquid composition introduction directly into the hollow interior 222 is particularly advantageous in situations in which the additive composition is resistant to being wetted by the liquid composition in contact with the container 210.

Container 210 can be used in a manner analogous to containers 10 and 110, and functions and is effective to release additive compositions from the hollow interior 222 into the liquid coolant composition. A coolant pump and a coolant filter element may be employed in this embodiment in a manner analogous to that described in Example 2.

Example 5

Figure 6:
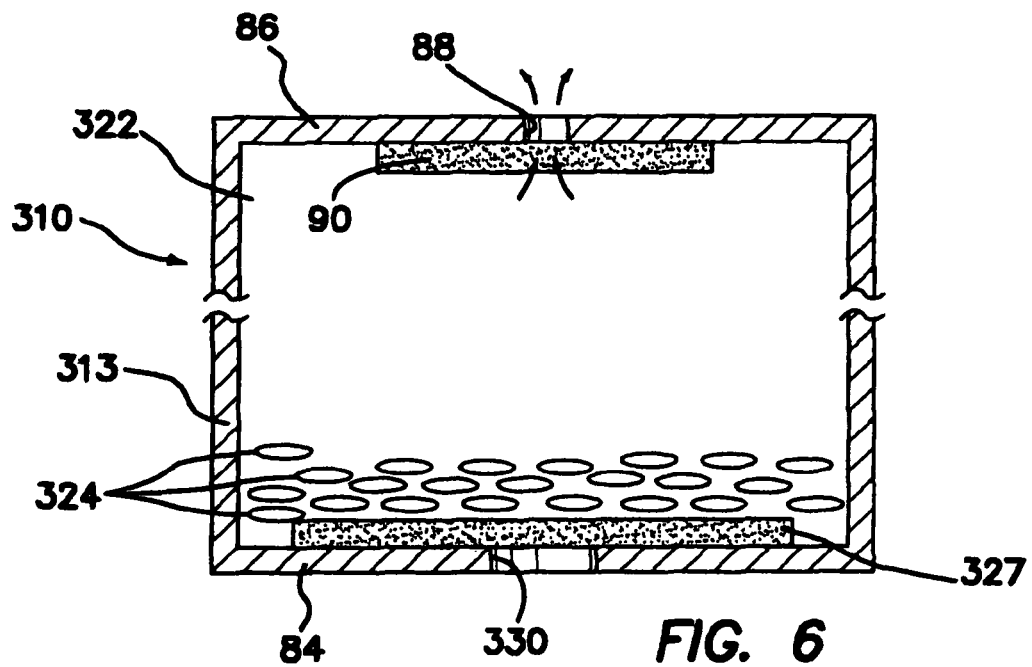
FIG. 6 is a somewhat schematic view of a further embodiment of an additive composition container in accordance with the present invention.

FIG. 6 shows a further container 310 of the present invention that, except as expressly described herein, is structured and functions substantially similarly to containers 10, 110, 210. The somewhat schematic character of FIG. 6 is meant to illustrate the distinguishing features of further container 310.

The container 310 generally comprises an elongated, cyclindrical casing body 313 defining a hollow interior 322 for containing particles 324 of an additive composition, for example, as described in Example 1.

The casing body 313 includes a first end wall 84 defining a relatively large opening 330. A membrane filter member layer or pad 327 covers the opening 330 and is secured in place, that is secured to first end wall 84, by an adhesive, as described elsewhere herein.

The casing body 313 includes an opposing, second end wall 86 defining a relatively smaller second opening 88. A further membrane filter member layer or pad 90 covers the second opening 88, and is secured in place, that is secured to second end wall 86, by an adhesive, as described elsewhere herein.

The ratio of the size or area of opening 330 to the size or area of second opening 88 may be in a range of about 2 or about 4 to about 12 or about 20, for example, about 10. In one embodiment, the ratio of the size or area of opening 330 to the size or area of the second opening 88 may be at least about 5. The ratio of the porosity of the membrane layer or pad 327 to the porosity of the further membrane layer or pad 90 may be in a range of about 1 or about 2 to about 10 or about 15.

The combination of the size of second opening 88 and the properties, for example, porosity, material type, electrical charge and the like, of the further membrane layer or pad 90 is such to allow air to escape the hollow interior 322 through second opening 88, and to substantially prevent liquid, such as water, aqueous based-liquid and the like, from entering the hollow interior 322 through second opening 88.

Container 310 may be placed in a liquid composition with the opening 330 below second opening 88, or with the opening 330 located downstream of second opening 88 in the event the liquid composition is flowing across container 310. As the container 310 becomes immersed in the liquid composition, the liquid composition passes through opening 330 and membrane layer or pad 327 into the hollow interior 322. As the liquid composition is so introduced into the hollow interior 322, air from inside the hollow interior exits through further membrane layer or pad 90 and second opening 88. The liquid composition and additive composition 324 in the hollow interior 322 is substantially prevented from passing through further membrane layer or pad 90 and second opening 88.

Container 310 functions in a manner similar to container 10 to effectively release the additive composition from the container through opening 330 into the liquid composition in which container 30 is present.

Since container 310 is structured to allow liquid to enter the hollow interior, the additive composition is effectively wetted by the liquid, which wetting may be advantageous to facilitating a controlled or consistent, for example, substantially constant, rate of release of the additive composition into the liquid composition.

Example 6

Figure 7:
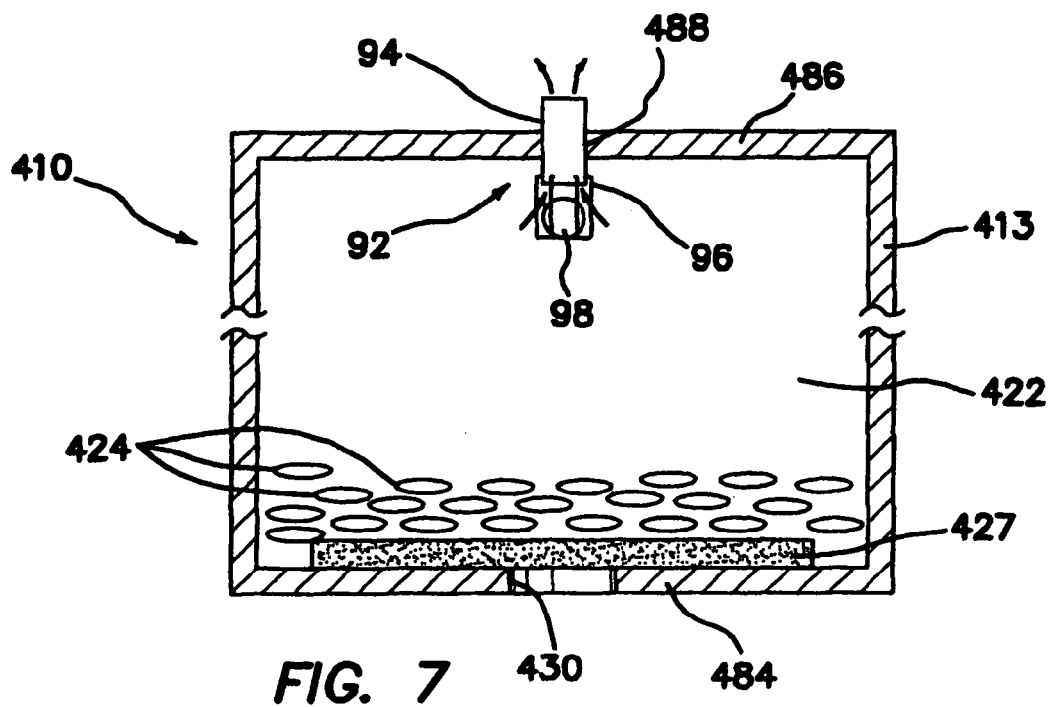
FIG. 7 is a somewhat schematic view of a valved embodiment of an additive composition container in accordance with the present invention.

FIG. 7 shows a valved container 410 of the present invention that, except as expressly described herein, is structured and functions substantially similarly to containers 10, 110, 210 and 310. The somewhat schematic character of FIG. 7 is meant to illustrate the distinguishing features of valved container 410.

The valved container 410 generally comprises an elongated cylindrical casing body 413 defining a hollow interior 322 for containing particles 324 of an additive composition, for example, as described in Example 1.

The casing body 413 includes a first end wall 484 defining a relatively large opening 430. A membrane filter medium layer or pad 427 covers the opening 430 and is secured in place, that is secured to first end wall 484, by an adhesive, as described elsewhere herein. The membrane layer or pad 427 is structured and functions similarly to membrane pad or layer 327.

The casing body 413 includes an opposing, second end wall 486 defining a second opening 488. A ball float valve, shown generally at 92, includes a valve port or conduit 94, a valve housing 96 and a ball 98 within the housing. The valve conduit 94 and valve housing 96 are secured together. The valve housing 96 and ball 98 are located internally within the casing body 413. The valve conduit 94 is secured, for example, interference fitted and/or by the use of an adhesive, to the casing body 413.

Container 410 may be placed in a liquid composition with the opening 430 below second opening 488, or with the opening 430 located downstream of second opening 488 in the event the liquid composition is flowing across container 310. As the container 410 becomes immersed in the liquid composition, the liquid composition passes through valve conduit 94 and opening 430 and membrane layer or pad 327 into the hollow interior 422. As liquid composition is so introduced into the hollow interior 422, air from inside the hollow interior exits through valve conduit 94. Once the liquid composition level in the hollow interior 422 reaches a level about equal to that of the ball 98, the ball will float up against the valve conduit 94 and close the valve 92 to substantially prevent any flow of material into or out of hollow interior 422 across valve 92. Thus, the liquid composition and additive composition 424 in the hollow interior 422 are substantially prevented from passing out of hollow interior 422 across valve 92.

Container 410 functions in a manner similar to container 310 to effectively release the additive composition from the container through opening 330 into the coolant (liquid composition).

Since container 410 is structured to allow liquid to enter the hollow interior, the additive composition is effectively wetted by the liquid, which wetting may be advantageous in facilitating a controlled or consistent, for example, substantially constant, rate of release of the additive composition into the coolant (liquid composition).

Example 7

Figure 8:
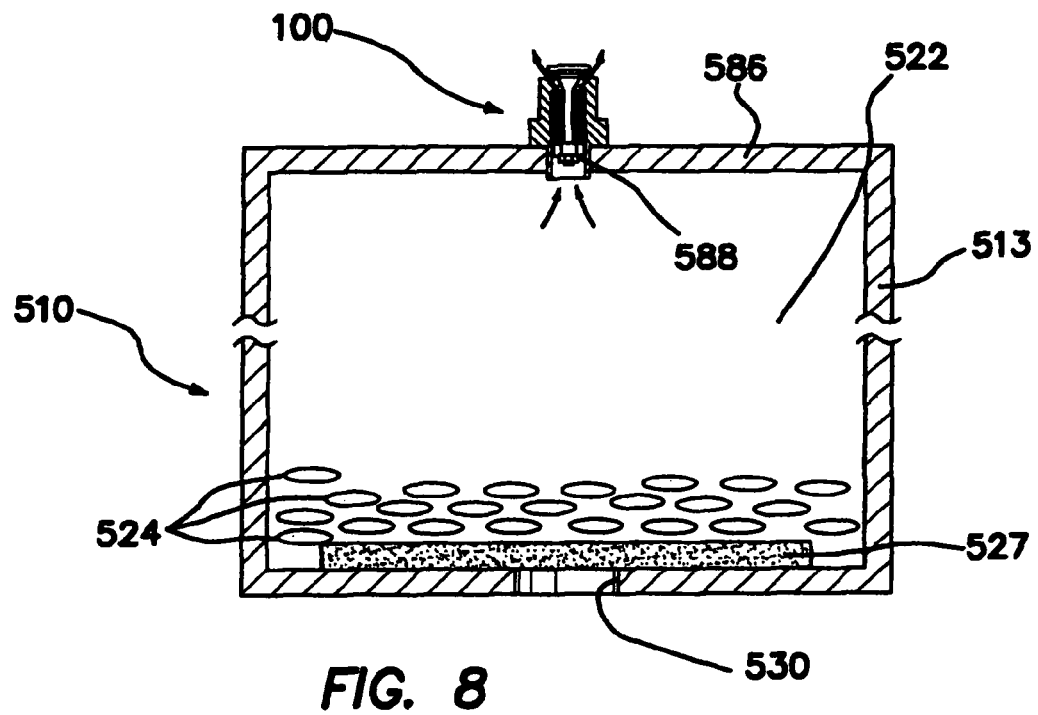
FIG. 8 is a somewhat schematic view of a further valued embodiment of an additive composition container in accordance with the present invention.

FIG. 8 shows a further valved container 510 of the present invention, that except as expressly described herein, is structured and functions substantially similarly to containers 10, 110, 210, 310 and 410. In particular, except as expressly described herein, valved container 510 is structured and functions similarly to valved container 410. The somewhat schematic character of FIG. 8 is meant to illustrate the distinguishing features of the further valved container 510.

The primary difference between valved container 510 and valved container 410 is the inclusion of a spring valve, shown generally as 100, is included, rather than the ball float valve 92 of valved container 410.

Spring valve 100 is situated largely external of casing body 513 and is in fluid communication with hollow interior 522 through second opening 588 in opposing second end wall 586.

The casing body 513 includes an opposing, second end wall 586 defining a second opening 588. The spring valve 100 is located largely external of the hollow interior 522, and is secured, for example, by the use of an adhesive, to the casing body 513. One feature of spring valve 100 is that it may be adjusted, for example, to control the pressure within hollow interior 522, as desired. This feature provides further control of further valved container 510 to further control the release of the additive composition into the liquid composition.

Container 510 may be placed in a liquid composition with the opening 530 below second opening 588, or with the opening 530 located downstream of second opening 588 in the event the liquid composition is flowing across container 310. As the container 510 becomes immersed in the liquid composition, the liquid composition passes through opening 530 and membrane layer or pad 527 into the hollow interior 422. As the liquid composition is so introduced into the hollow interior 422, the pressure within the hollow interior increases. When the cracking pressure of the spring valve 100 is reached, the valve opens and air from inside the hollow interior exits through the open valve. Once the pressure in the hollow interior 522 is lowered below the cracking pressure the spring valve 100 will close or seal. By controlling the cracking pressure of spring valve 100, it is possible to control the amount of liquid composition present in the hollow interior 522 and, at least to some extent; the release rate of the additive composition 524 into the liquid composition outside the casing body 513. With the spring valve closed or sealed, the liquid composition and additive composition 524 in the hollow interior 522 is substantially prevented from passing out of hollow interior 422 across the spring valve.

Container 510 functions in a manner similar to container 310 to effectively release the additive composition from the container through opening 530 into the liquid composition.

Example 8

Figure 9:
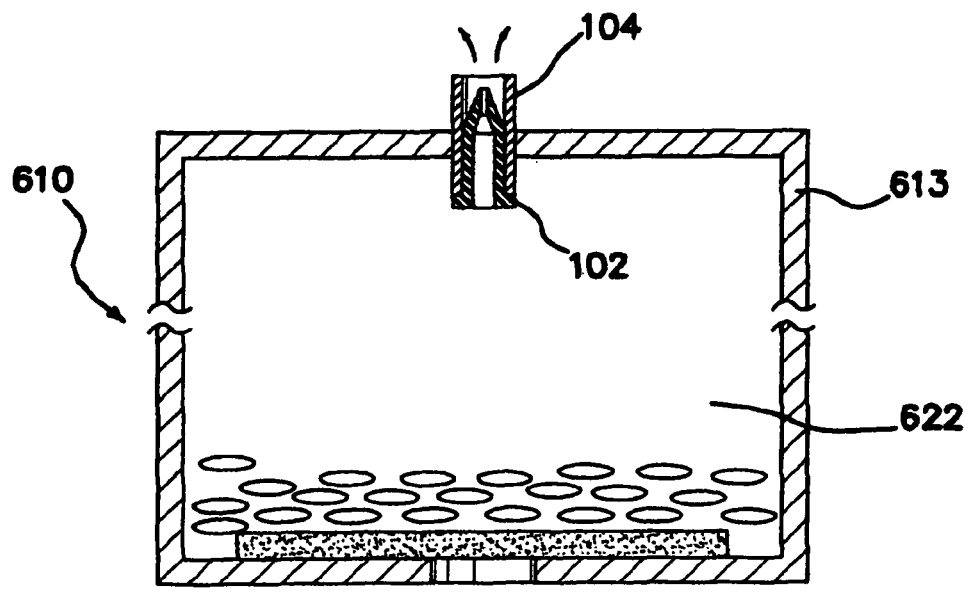
FIG. 9 is a somewhat schematic view of an additional valved embodiment of an additive composition container in accordance with the present invention.

FIG. 9 shows an additional valved controlled release system 610 of the present invention. Except as expressly described herein, additional valved system 610 functions similarly to controlled release systems 10, 110, 210, 310, 410 and 510. In particular, except as expressly described herein, valved controlled release system 610 is structured and functions similarly to valved system 410, with the primary difference being that ball float valve 92 in system 410 has been replaced by a one-piece high precision valve, specifically a duckbill valve 102. Duckbill valve 102 is sealed to a suitable valve housing 104 which is fitted, for example friction fitted, to casing body 612.

Duckbill valve 102 in this example is a one-piece, molded elastomeric duckbill valve that is open when there is a positive differential pressure in hollow interior 622 of casing body 613 relative to the exterior of the casing body 613. As water fills hollow interior 622, air passes freely through open duckbill valve 102. Once the hollow interior 622 is filled with the liquid composition and the system 610 is fully immersed in the liquid composition, pressure is equalized between hollow interior 622 and the exterior of casing body 613, causing duckbill valve to close to flow of material into or out of the hollow interior 622.

Duckbill valves suitable for use in the present systems are commercially available, for example, from Vernay Laboratories, Inc., having corporate headquarters located in Yellow Springs, Ohio.

Example 9

Figure 10:
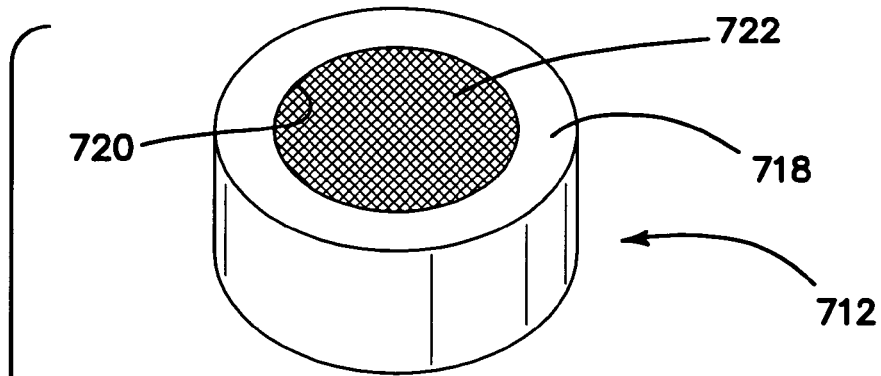
FIG. 10 is a perspective view of a cap or lid and casing body for use with the cap of a still further additive composition container of the present invention.
Figure 11A:
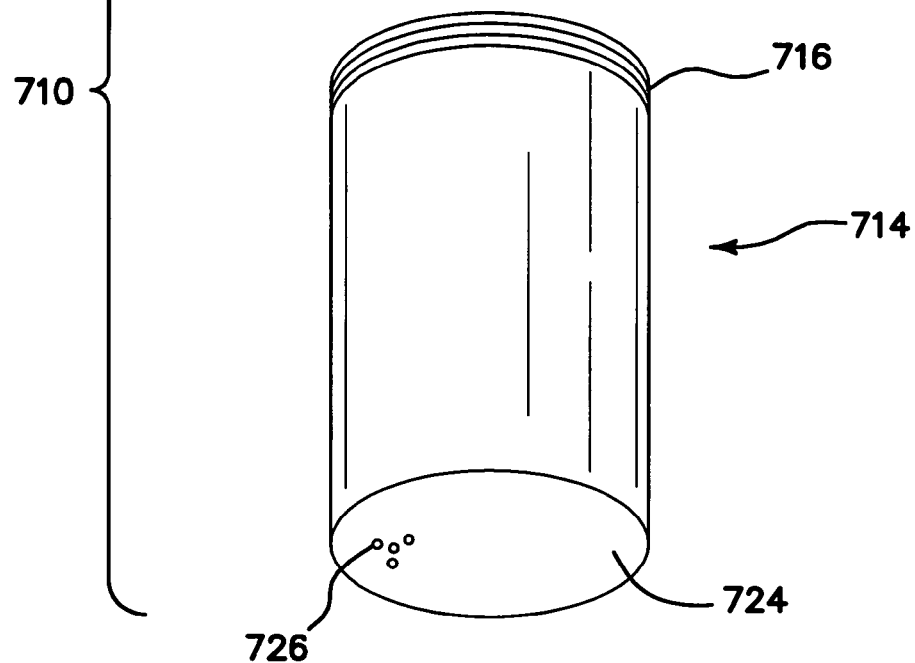
FIG. 11A is a bottom plan view of the casing body shown in FIG. 10.
Figure 11A:
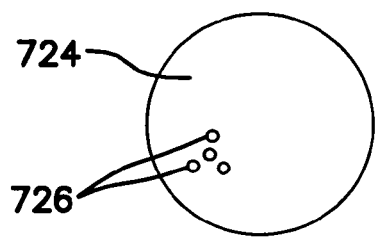
Figure 11B:
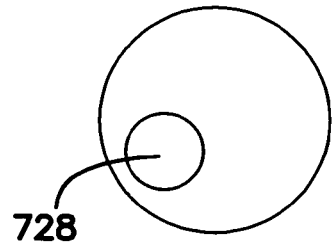
FIG. 11B is a bottom plan view of the casing body shown in FIG. 10 with a valve, such as an umbrella valve, installed.

FIGS. 10, 11A and 11B show component parts of a still further additive composition container 710 in accordance with the present invention. Container 710 includes an end portion, such as a cap or lid, 712 and a casing body 714. The casing body 714 includes or defines an interior hollow space or hollow interior (defined by the inner walls of the casing body, which has a substantially open top) in which an additive composition is placed. Both the cap or lid 712 and the casing body 714 include complementary fastening structures to allow the cap and casing body to be coupled together and uncoupled from each other, as desired. The fastening structure (for example, outer or external threads) on casing body 714 is shown at 716. The lid 712 can be coupled to casing body 714 by rotation of one of the components relative to the other or by applying another coupling force to the components. In this manner, lid 712 can be removably coupled or affixed to casing body 714.

Both the lid 712 and the casing body 714 may comprise or be made of any suitable material, for example, one or more polymeric materials. Examples of useful polymeric materials include, without limitation, polyolefins, polyamides (nylon), any suitable polymeric material, such as those which are conventional and/or -well known and/or commercially available. Such polymeric materials may include polypropylene or polyethylene. The lid 712 and casing body may comprise the same polymeric material or different polymeric materials.

When the lid 712 comprises a polymeric material, this component is often made by a molding process, for example, using conventional and/or well known molding techniques. The casing body 714 may also be molded using conventional and well known techniques. The casing body and lid can be made using any suitable manufacturing process, for example, any conventional and/or well known process.

With particular reference to lid 712, the top portion or wall 718 is formed so as to have a through hole 720 in the top surface. A liquid permeable membrane member 722 is located so as to cover through opening 720.

In a particularly useful embodiment, membrane member 722 is molded into the lid 712, for example, co-molded with the lid 712. In this way, the membrane member 722 is fixedly attached to the cap 712 and completely covers the through hole 720.

The membrane member 722 may be made of any suitable material useful and effective in the application in which container 710 is to be used. Examples of useful materials from which the membrane member 722 can be produced include, without limitation, polyolefins, such as polypropylene, polyethylene, cellulose acetate, polyamides (nylon), polytetrafluoroethylene (teflon) and the like. The membrane can be used in its native or untreated state or, if desired, can be further treated with one or more agents to impart one or more special or desired properties, for example, and without limitation a surface charge and the like, to the membrane to add in controlling release and/or to provide enhanced control of the release of the additive composition from the container.

The molding or co-molding process by which the membrane member 722 is molded in or co-molded with the lid 712 can be any conventional and/or well known molding or co-molding process. For example, the membrane member 722, in a form somewhat larger than the through hole 720, is placed in a mold with the center area of the membrane member being protected, so that the area that is protected is not covered by the polymeric material from which the lid 712 is made, and can be exposed in the final product or lid 712. A molten polymeric material is poured into the mold and the lid 712 is formed with the outer peripheral edge of the membrane member 722 covered by or molded in the polymeric material of the lid 712. Thus, for example, the outer edge of the membrane (not shown in FIG. 10), is located within the molded lid 712 and is secured to the polymeric material of the lid. Because the center portion of the membrane member 722 was protected during co-molding, the final lid 712 includes an exposed central membrane area, shown as membrane member 722 in FIG. 10.

The exposed area of membrane member 722 allows a liquid, for example, an aqueous liquid, to pass through through hole 720 and the membrane member, and come in contact with the additive composition within the hollow interior of the casing body 714. After contacting the additive composition, the liquid passes out of the container 710, for example, through hole 720 and membrane member 722, at which point the liquid includes sufficient additive composition to have been treated with the additive composition as intended and/or desired.

As shown in FIG. 10, the area of the membrane member 722 that is exposed is relatively large. This allows for more contact between the liquid and the additive composition in the hollow interior space of container 710 and increased release of the additive composition into the liquid composition. The size of the exposed membrane member can be selected, as desired, to achieve the desired level of treatment/treatments of the liquid composition being treated.

The size of the casing body 714 (as well as the lid 712 and the exposed area of the membrane member 722) can be selected to satisfy the requirements of the application in which the container 710 is to be used. For example, the size of the casing body 714 can be such as to include a hollow interior space or hollow interior having any suitable volume, for example, and without limitation, a volume of about 1 ounce or less to about 100 ounces or more, such as of about 1 ounce to about 20 ounces or about 40 ounces or about 60 ounces or more.

Specific sizes of the hollow interior space of the casing body 714 include, but are not limited to, about 2 ounces, about 8 ounces, and about 16 ounces and about 32 ounces. Containers in accordance with the present invention may have any suitable size of hollow interior space, including sizes much larger than 32 ounces.

As shown in FIG. 11A, the bottom 724 of the casing body 714 includes a plurality of through holes 726. These through holes 726 can be produced in the process of molding the casing body 714 or by puncturing the bottom by mechanical and/or other force, (for example drilling or punching) for example, after the casing body 714 is molded or otherwise formed.

A valve, such as umbrella valve 728 shown in FIG. 11B, allows the majority of air to escape the hollow interior space of the container in use, and does not allow or prevents the liquid to be treated from passing across the valve either into or out of the hollow interior space. The valve may be selected with a desired back pressure to maintain a small amount or bubble of air in the container, for example, at the top of the container, when in use so that the only liquid to liquid contact is through the membrane, such as membrane member 722. In this way, the membrane can very effectively function in controlling the release of the additive composition from the container. The number, size, and arrangement of holes 726 are provided to specifically work with a specific valve, e.g., a specific umbrella valve. Different valves require different arrangements. For example, and without limitation a ball and seat valve requires only one, much larger opening or hole in which it sits.

One valve is generally adequate to allow air to be released from the hollow interior space if the container is oriented vertically or substantially vertically, that is with the valve and hole or holes being located above the membrane. However, if the orientation of the container is such that the hole or holes and membrane are horizontal or substantially horizontal to each other, two or more valves can be provided at two or more spaced apart locations so that one is always at the upper half of the container to allow sufficient air release and liquid entry to allow release of the additive composition from the container.

In one very useful embodiment, the container 712 shown in FIGS. 10, 11A and 11B can be used by placing a scale inhibitor or anti-scaling agent (component), such as polyacrylic acid, in the interior hollow space of the casing body 714. The container can then be used in a misting or mister system in which a stream of water is provided and is formed into a mist (fine liquid, e.g. water, droplets in air) for cooling or other purposes, for example, to be used to cool home air conditioners and increase their efficiency. In this particular application, the size of the interior hollow space of casing body 714 may be 2 (or about 2) ounces. This size of apparatus or container may be referred to as a "2 ounce bottle".

Substantially the same apparatus can be provided in a 16 ounce (about 16 ounce) and 32 ounce (about 32 ounce) bottle, or interior hollow space size of the casing body 714, for use with large misting or mister systems, such as those systems used, for example, in amusement parks and sports venues. Such large bottles or containers may require a lid or cap which provides additional support for the exposed area of the membrane, since a large membrane surface may be, and often is, exposed in such relatively large containers. Such supported membrane members are discussed hereinafter.

The umbrella valve 728 employed may be the same regardless of the size of the container, for example, whether the size of the container 710 is 2 ounces or 32 ounces. A larger valve may be employed with a larger container (larger hollow interior space of casing body 714). Alternately, multiple valves, for example, two or more of the same valves, can be used with larger containers. Using the same valves regardless of container size advantageously reduces parts inventory and avoids manufacturing mistakes, for example, using the wrong valve.

A larger, for example, more than about 2 ounces or about 5 ounces, container 710 may be employed to feed one or more additives, such as microbiocides, anti-scaling agents, corrosion inhibitors (corrosion control components) and the like to liquid compositions for use in other types of cooling systems and/or in other applications.

In certain embodiments, the present containers, such as container 710, may be used to feed anti-scaling agents (scale inhibitors) corrosion inhibitors, anti-fouling agents and the like to reverse osmosis units, other process applications and the like. Also, the present containers, such as container 710, may be used to treat an aqueous liquid composition with an additive or additives to make the aqueous liquid composition potable or to maintain the aqueous liquid composition in a potable condition.

In use, the container 710 may be placed in a flowing liquid composition, or a sump or other similar region, for example, where the liquid composition to be treated is present or collects, of a system using the liquid composition to be treated. The container 710 is advantageously positioned so that the membrane member 722 is located below or at substantially the same level as the plurality of through openings 726. The preferred positioning is a vertical arrangement where the membrane member 726 is down and the air release valve 728 is at the top. Such positioning allows more effective removal of air from the hollow interior space of a casing body 714, and more effective contact of the liquid composition with the additive composition within the hollow interior space of the casing body.

Figure 12:
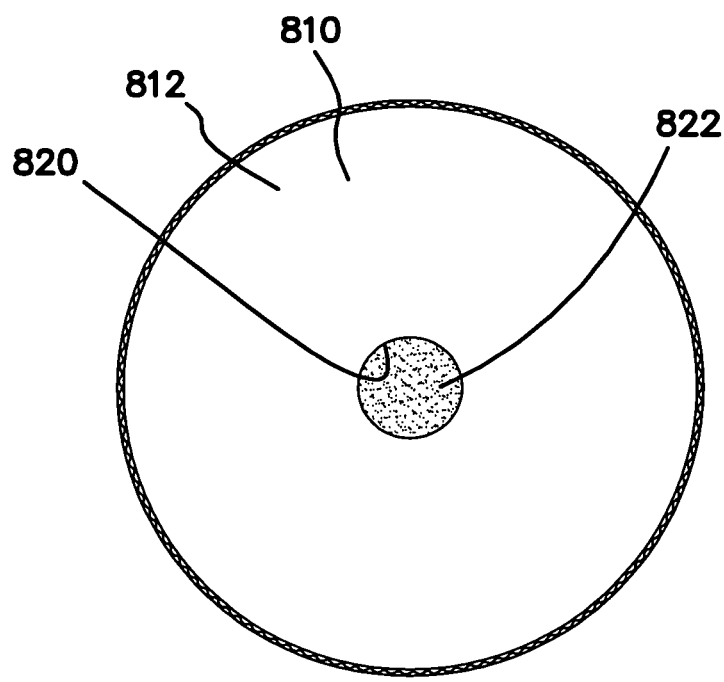
FIG. 12 is a top plan view of an alternate embodiment of a cap or lid of an additive composition container of the present invention.

In FIG. 12, a lid 812 is shown and, except as expressly stated herein, is structured similarly to lid 712. The primary difference between lid 812 and lid 712 is the size of the opening 820. In particular, opening 820 is substantially smaller in size than opening 720. Thus, a smaller amount of membrane member 822 is exposed. This provides for less membrane area for the additive composition to diffuse through.

Without wishing to limit the invention to any particular theory of operation, it is believed that the mechanism by which the present containers work is diffusion, for example, analogous to diffusion through a cell wall in biological systems or diffusion through human skin. The amount of additive composition that passes through a given area in a given time frame depends, for example, on the difference in concentration across the membrane, such as a solution saturated or substantially saturated with additive composition inside the hollow interior space of the container and a lower, even substantially zero concentration of additive composition outside the container. The more exposed area there is, the larger the amount of additive composition can pass through the membrane.

A low solubility additive or additive composition requires a larger area to diffuse than a high solubility additive or additive composition. For example, a polyacrylate is highly soluble in water so the membrane area needed to release this additive into liquid water is relatively small.

Container 810 may be employed and functions in a manner similar to that described with regard to container 710. Assuming that all other things are equal, for example, that containers 710 and 810 are the same size and hold the same additive composition and that membrane members 722 and 822 are the same in composition and structure, a lesser amount of additive composition per unit time is released from container 810 into a liquid composition relative to the rate of release of the additive composition with container 710. In one embodiment, the size of the exposed area of the membrane members might be enlarged or reduced to release a different additive composition at the same rate.

Figure 13:
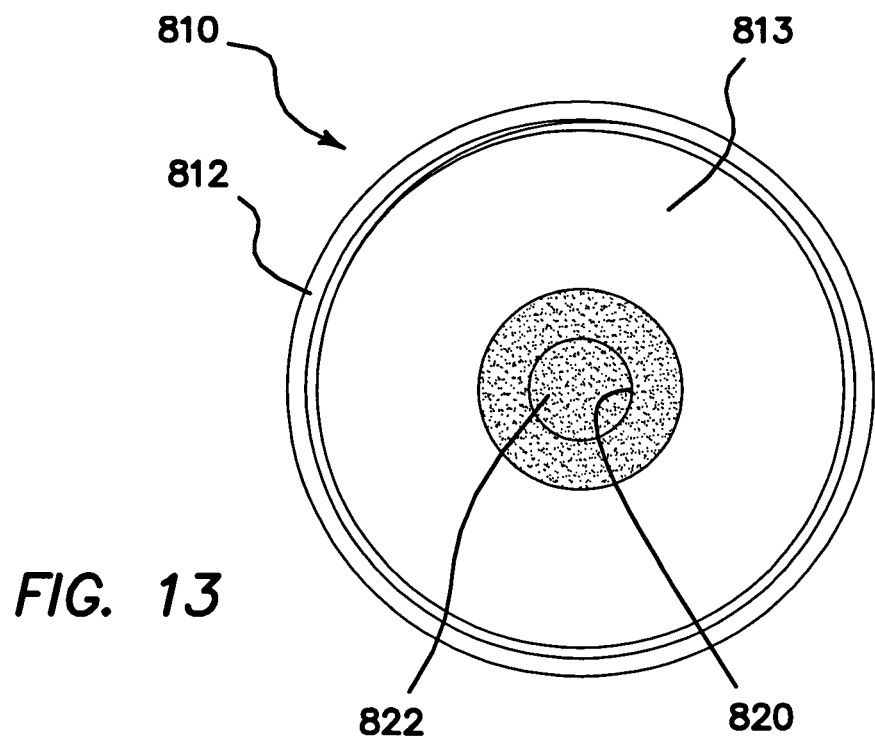
FIG. 13 is a view of the inner portion of the cap or lid shown in FIG. 12.

FIG. 13 shows the inner surface 813 of the lid 812 in which the membrane member 822 is co-molded to the cap 812. As shown, the membrane member 822 extends well outwardly of the exposed area of the membrane member 822, which exposed area is substantially defined by the opening 820 in the lid 812. Thus, the outer portion of the membrane member 822 is molded into the lid 812 and results in the membrane member 822 being firmly, and even fixedly, attached to the lid 812.

Figure 14:
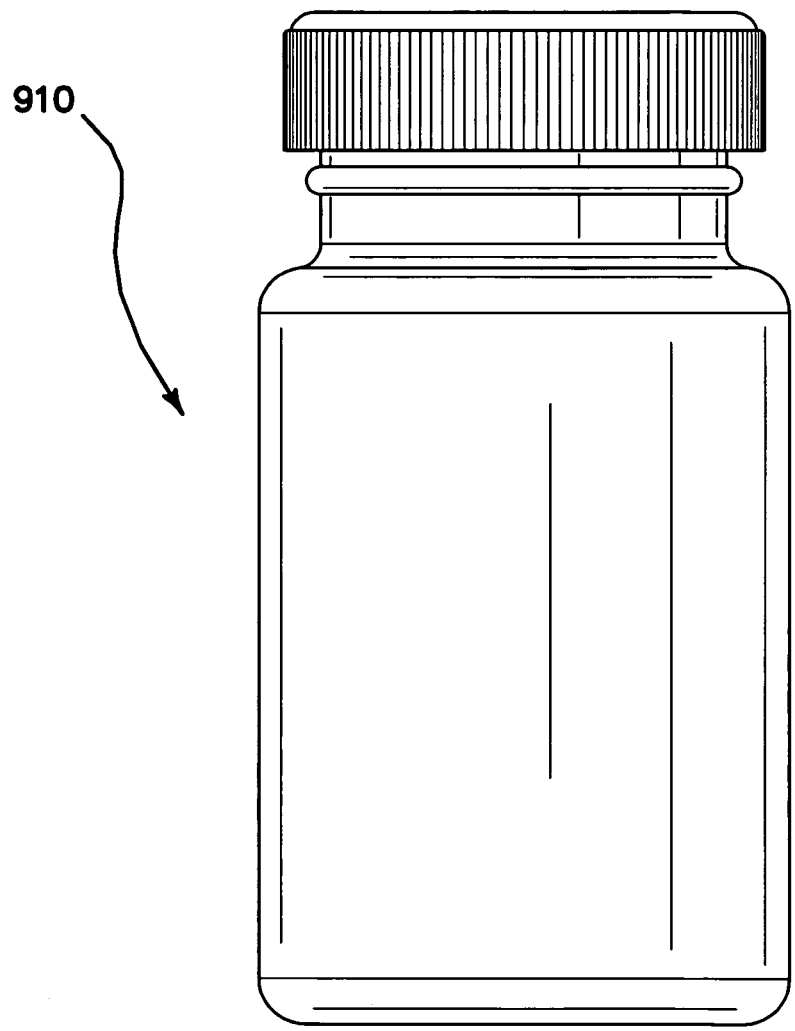
FIG. 14 is a side plan view of yet another additive composition container of the present invention with the cap or lid removably secured to the casing body.

FIG. 14 shows an embodiment of an actual 2 ounce bottle 910 in accordance with the present invention.

Figure 15:
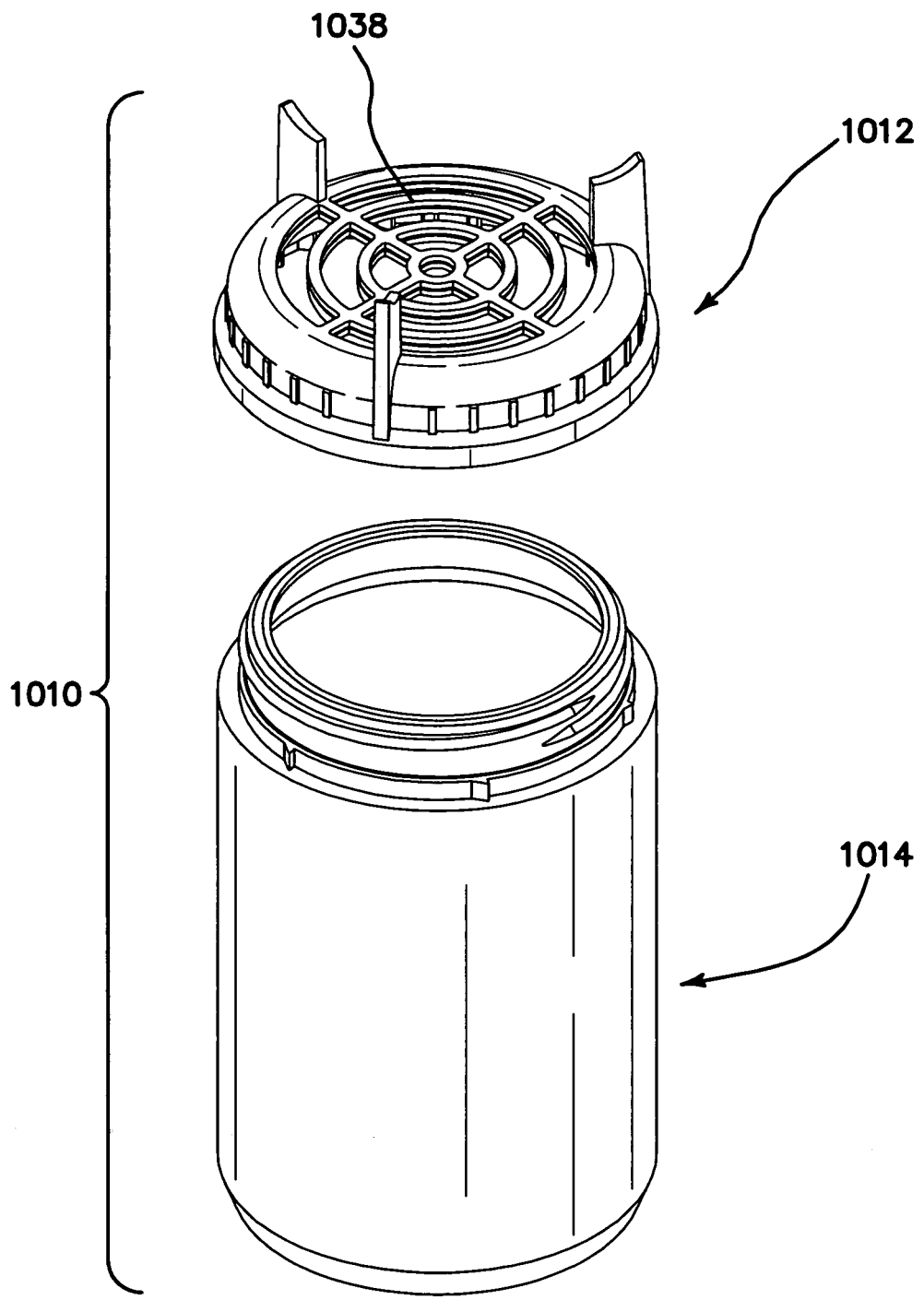
FIG. 15 is an exploded perspective view of certain components of a further alternate additive composition container of the present invention.

FIG. 15 shows a further alternate container 1010, somewhat similar to container 710, in accordance with the present invention. Container 1010 includes a support grid 1038 which is provided across the top of lid 1012. This support grid 1038, which can be molded into lid 1012, to form a unitary lid structure, extends across the exposed area of the membrane member 1022 (not shown in FIG. 15), which membrane member can be co-molded with the lid 1012 or otherwise secured to the lid 1012, to support the membrane member during use of container 1010. Alternatively, the peripheral portion of membrane member 1022 can be placed in a groove formed in lid 1012 and held in place by the pressure provided by the coupling of lid 1012 to casing body 1014. This type of container, with a support grid, is particularly useful when the exposed area of the membrane member is relatively large and the exposed area of the membrane member may be under stress and subject to being torn or otherwise punctured or damaged if not supported. The locking mechanism provided on lid 1012 and casing body 1014 is such as to allow the lid to be screwed on and secured to the casing body, but does not allow the lid to be removed from the casing body without effectively destroying the lid and/or the casing body, so that the container 1010 cannot be reused. Thus, container 1010 is a single use container and is disposed of after such single use.

In contrast, many of the other containers disclosed herein can be refilled with additive composition and reused. In certain cases, the lid and/or membrane are replaced before the container is reused.

Figure 16:
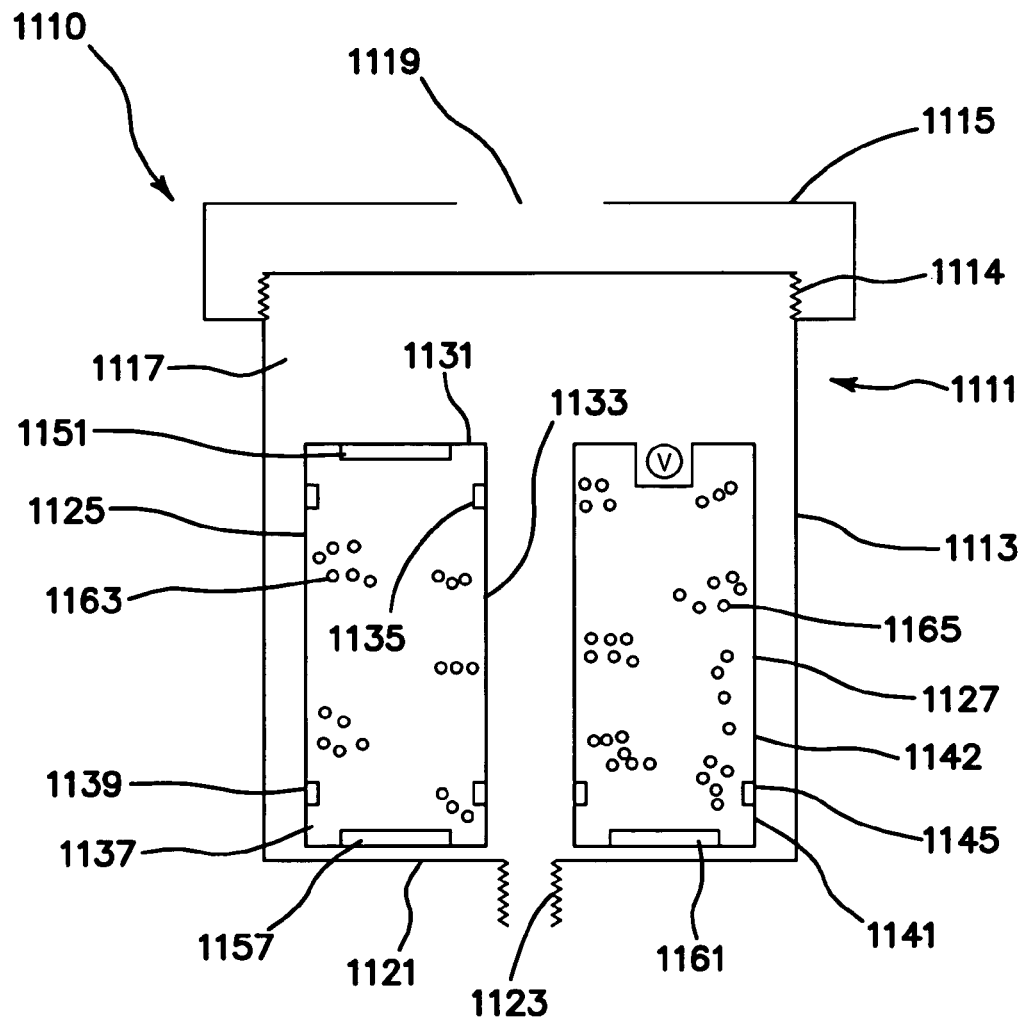
FIG. 16 is a schematic view of a still further alternate additive composition container of the present invention.

FIG. 16 shows a schematic view of a still further alternate container 1110 in accordance with the present invention.

Container 1110 includes an outer casing 1111 comprised of a body portion 1113 and a removable end portion 1115. End portion 1115 is removably secured to body portion 1113 by being rotated relative to body portion 1113 using mating threads, shown schematically at 1114, on both end portion 1115 and body portion 1113. Body portion 1113 defines an interior hollow space 1117. End portion 1115 includes an outlet 1119. The opposite end 1121 of body portion 1113 includes an inlet 1123.

Two inner casings 1125 and 1127 are located in hollow interior space 1117 of outer casing 1111. As shown in FIG. 16, the two inner casings 1125 and 1127 are situated in a side-by-side relationship. It should be noted that these inner casings 1125 and 1127 can be situated in a vertical stack, as opposed to the horizontal stack shown in FIG. 16, or can be randomly placed in the hollow interior space 1117. All of these embodiments are included within the scope of the present invention. It is advantageous to have at least a portion of the top of each inner casing 1125 and 1127 located above the bottom of the respective inner casing. This will allow for proper functioning of the inner casings 1125 and 1127 within the outer casing 1111.

Inner casing 1125 is structured and functions similarly to container 310 shown in FIG. 6. Also, inner casing 1127 is structured and functions similarly to container 410 shown in FIG. 7.

The primary difference between inner casing 1125 and container 310 is that inner casing 1125 includes a first end or top portion 1131 which is removably secured to the main or body portion 1133 of inner casing 1125 by rotatable mating threads, shown schematically at 1135. Also, a second or bottom portion 1137 of inner casing 1125 is removably secured to the main or body portion 1133 by rotatable mating threads, shown schematically in FIG. 16 at 1139.

In addition, the primary difference between inner casing 1127 and container 410 is that second or bottom portion 1141 is removably secured to the main or body portion 1143 of inner casing 1127 by rotatable mating threads, shown schematically at 1145.

These removable portions 1131, 1137 and 1141 allow the membranes 1151, 1157 and 1161, respectively, connected or secured to each of end portion to be replaced, for example, by replacing the entire end portion with a different end portion including a new membrane, after use of the container 1110.

The additive compositions 1163 and 1165 in the inner casings 1125 and 1127, respectively are different in chemical make-up from each other. However, the additive compositions in each of the inner casings 1125 and 1127 can have the same chemical make-ups.

In one embodiment, the additive compositions are different from each other because the additive compositions are or may be incompatible with each other so that if the two additive compositions were to be combined in a single casing or inner casing, the additive compositions could or would interact and/or otherwise degrade in activity to the disadvantage of the operation of the system. Also, one or both of the additive compositions in inner casings 1125 and 1127 may include a microbiocide which is dangerous for handling by humans. Placing such an additive component in an inner casing, for example, as the only active additive component in a clearly marked separate inner casing, included in an outer casing provides an additional safety feature by further isolating the dangerous material.

The container 1110 can be used as follows. With the inner casings 1125 and 1127 being filled with appropriate additive compositions, the container 1110 is provided to an application for use. After a period of time in use, the additive compositions in the inner casings 1125 and 1127 are exhausted and the container 1110 is removed from service. The container 1110 is then returned to the manufacturer where the container is opened, by rotating the end portion 1115 relative to the body portion 1113 is checked to be sure the membranes and valve continue to be useful. For example, if one of the membranes has been compromised or is otherwise ineffective, the end portion of the inner casing in question can be removed and replaced by a new end portion with a new membrane. In any event, the inner casings are again filled with appropriate additive compositions and are ready to be provided to the application for use to provide for controlled release of the additive compositions.

If desired, the container 1110 can be sized so that more than two inner casings can be included in the interior hollow space 1117 of container 1110.

Certain aspects and advantages of the present invention may be more clearly understood and/or appreciated with reference to the following commonly owned United States patent applications, the disclosure of each of which is being incorporated herein in its entirety by this specific reference: U.S. patent application Ser. No. 12/154,900, filed May 27, 2008, entitled "Controlled Release Cooling Additive Composition"; and U.S. patent application Ser. No. 12/154,899, filed May 27, 2008 entitled "Controlled Release of Microbiocides".

A number of publications, patents and patent applications have been cited hereinabove. Each of the cited publications, patents and patent applications are incorporated herein by reference in their entireties.

While the present invention has been described with respect of various specific examples and embodiments, it is to be understood that the invention is not limited thereto and that it can be variously practiced within the scope of the following claims.

What is claimed is:

1. A container for releasing an additive composition into a liquid composition, the container comprising:
   a casing impermeable to a liquid composition, the casing comprising a casing body and a separate end portion coupled to the casing body, the casing body defining a substantially hollow interior, at least one opening in the separate end portion into the substantially hollow interior and at least one further opening into the substantially hollow interior, the at least one further opening located in an end of the casing body substantially opposite the end portion and being positioned to allow air to pass out of the substantially hollow interior through the at least one further opening;
   a plurality of solid particles of an additive composition comprising a chemical additive component located in the substantially hollow interior of the casing body;
   a membrane component covering the at least one opening in the separate end portion and is effective to provide for release of the additive composition from the substantially hollow interior into a liquid composition in contact with the casing, the membrane component being fixedly secured to the separate end portion;
   a support structure extending across the membrane component covering the at least one opening to support the membrane component, the support structure and the separate end portion being a unitary structure; and
   an umbrella valve operable to allow air to pass out of the substantially hollow interior through the at least one further opening and to substantially prevent a liquid from passing into or out of the substantially hollow interior across the valve through the at least one further opening.

2. The container of claim 1, wherein the membrane component is co-molded with the separate end portion.

3. The container of claim 1, wherein the additive composition includes an additive component selected from the group consisting of corrosion inhibitors, microbiocides, scale inhibitors, dispersants, buffering agents, surfactants, anti-fouling agents and mixtures thereof.

4. The container of claim 1, wherein the substantially hollow interior has a volume in a range of about 1 ounce to about 100 ounces.

5. The container of claim 1, wherein the support structure is positioned so that the membrane component covering the at least one opening in the separate end portion is located between the substantially hollow interior and the support structure when the separate end portion is coupled to the casing body.

6. A method of treating a liquid composition, the method comprising placing a container in contact with a liquid composition, the container comprising a casing impermeable to a liquid composition, the casing comprising a casing body and a separate end portion coupled to the casing body, the casing body defining a substantially hollow interior, at least one opening in the separate end portion into the substantially hollow interior and at least one further opening into the substantially hollow interior, the at least one further opening located in an end of the casing body substantially opposite the end portion and being positioned to allow air to pass out of the substantially hollow interior through the at least one further opening; a plurality of solid particles of an additive composition comprising a chemical additive component located in the substantially hollow interior of the casing body; a membrane component covering the at least one opening in the separate end portion and is effective to provide for release of the additive composition from the substantially hollow interior into a liquid composition in contact with the casing, the membrane component being fixedly secured to the separate end portion; a support structure extending across the membrane component covering the at least one opening to support the membrane component, the support structure and the separate end portion being a unitary structure; and an umbrella valve operable to allow air to pass out of the substantially hollow interior through the at least one further opening and to substantially prevent a liquid from passing into or out of the substantially hollow interior across the valve through the at least one further opening, the additive composition being effective when released into the liquid composition to treat the liquid composition, thereby treating the liquid composition.

7. The method of claim 6, wherein the liquid composition is an aqueous liquid composition.

8. The method of claim 6, wherein the additive composition comprises a scale inhibitor, and the liquid composition is an aqueous liquid composition to be used in cooling application.

9. The method of claim 6, wherein the liquid composition is an aqueous liquid composition and is treated using the container to make the aqueous liquid composition potable or to maintain the aqueous liquid composition in a potable condition.

10. The method of claim further comprising placing the container in an appropriate position relative to a system selected from the group consisting of a down hole drilling system, an enhanced oil recovery system, an air washer system, a fracturing fluid heating system, an industrial cooling system and a commercial cooling system so that the additive composition from the substantially hollow interior is released into a liquid composition used in the system.

* * * * *